INVENTORS
Seymour Henig
Ervin C. Palasky
BY
David Robbins
ATTORNEY

INFORMATION STORAGE AND CATEGORY SELECTOR

Original Filed June 21, 1963 14 Sheets-Sheet 2

INVENTORS
Seymour Henig
Ervin C. Palasky
BY
David Robbins
ATTORNEY

INVENTOR
Seymour Henig
Ervin C. Palasky
BY David Robbins
ATTORNEY

INVENTORS
Seymour Henig
Ervin C. Palasky
BY
David Robbins
ATTORNEY

INFORMATION STORAGE AND CATEGORY SELECTOR

INVENTORS
Seymour Henig
Ervin C. Palasky
BY
[signature]
ATTORNEY

INVENTORS
Seymour Henig
Ervin C. Palasky
BY
David Robbins
ATTORNEY

INFORMATION STORAGE AND CATEGORY SELECTOR

INVENTORS
Seymour Henig
Ervin C. Palasky
BY
David Robbins
ATTORNEY

INFORMATION STORAGE AND CATEGORY SELECTOR

Original Filed June 21, 1963 14 Sheets-Sheet 8

INVENTORS
Seymour Henig
Ervin C. Palasky

BY David Robbins
ATTORNEY

INVENTORS
Seymour Henig
Ervin C Palasky
BY
David Robbins
ATTORNEY

INFORMATION STORAGE AND CATEGORY SELECTOR

INVENTORS
Seymour Henig
Ervin C. Palasky
BY David Robbins
ATTORNEY

INVENTORS
Seymour Henig
Ervin C. Palasky
BY David Robbins
ATTORNEY

INVENTORS
Seymour Henig
Ervin C. Palasky
BY David Robbins
ATTORNEY

INVENTORS
Seymour Henig
Ervin C. Palasky
BY
David Robbins
ATTORNEY

INVENTORS
Seymour Henig
Ervin C. Palasky
BY David Robbins
ATTORNEY

United States Patent Office 3,397,392
Patented Aug. 13, 1968

3,397,392
INFORMATION STORAGE AND CATEGORY SELECTOR

Seymour Henig, Kensington, and Ervin C. Palasky, Silver Spring, Md., assignors to the United States of America as represented by the Secretary of Commerce Original application June 21, 1963, Ser. No. 289,761, now Patent No. 3,300,066, dated Jan. 24, 1967. Divided and this application Oct. 31, 1966, Ser. No. 591,003
16 Claims. (Cl. 340—172.5)

ABSTRACT OF THE DISCLOSURE

This application describes an information storage and selector system that is used in a sorting machine. The machine includes several stations, each having a rack containing a plurality of slots positioned above a conveyor belt common to all stations. An operator, reading the destination of a letter to be sorted, operates a keyboard at a station to generate a category code representing the destination. The letter is then dropped in the first empty slot and the number code of the slot is generated.

An information storage system receives the category and slot number codes as they are aperiodically generated at the sorting stations and effects the storage of these codes in a loading buffer section. The stored number code and an identical number code pre-recorded in the system are employed to place the category code for each letter in a section whose position in a memory is analogous to the letter's physical location in its rack. A running inventory with respect to categories is kept for the letters stored in the slots at each station. Periodically, a selector system makes a determination premised on optimum inventory reduction, of a selected category to be unloaded from the slots. The code of this category is recorded in a section of the memory, which retains a list of all selected categories. The selector system continuously makes identity comparisons between the latter categories and those of the letters stored in the slots. Each identity is converted to a gate-opening signal, the latter controlling the gate of a respective one of said slots, permitting the letter contained therein to fall in the appropriate stack forming on the conveyor belt.

*Cross-reference to a related application*

This application is a division of U.S. patent application Ser. No. 289,761 entitled, "A Sorting Machine Providing Self-Optimizing Inventory Reduction," which was filed on June 21, 1963, by Seymour Henig and Ervin E. Palasky and is now U.S. Patent No. 3,300,066 issued on Jan. 24, 1967.

*Brief description of the invention*

In accordance with the principles of the present invention an embodiment of an information storage and selector system is provided that aperiodically receives a plurality of slot number and related category codes. The received number codes are used to write the related category codes in a storage device in a certain relation to the number codes pre-recorded therein. Thus, a plurality of the same category codes, each related to a different slot number code, are written in the storage device. A running inventory is kept that comprises several tally codes, each having a magnitude indicating the number of times a particular category code is recorded in the storage device. A threshold code is also stored for each category code. Premised on optimum inventory reduction, the system selects a sequence of category codes as a function of the tally and threshold codes. A comparison is made between each selected and each category code in the storage device, and an output signal is generated whenever an identity is found.

*Brief description of the drawings*

With reference to the drawings wherein like numerals designate like parts throughout the figures:

FIG. 5 is a block diagram that illustrates the manner in which

FIG. 5A and 5B constitute a circuit diagram of the loading buffer units in FIG. 1;

FIG. 8 is a block diagram illustrating the way in which FIGS. 8A and 8B are assembled;

FIGS. 8A and 8B comprise a circuit diagram of the unload category selector in FIG. 1.

*The block diagram (FIG. 1)*

Figure 1:
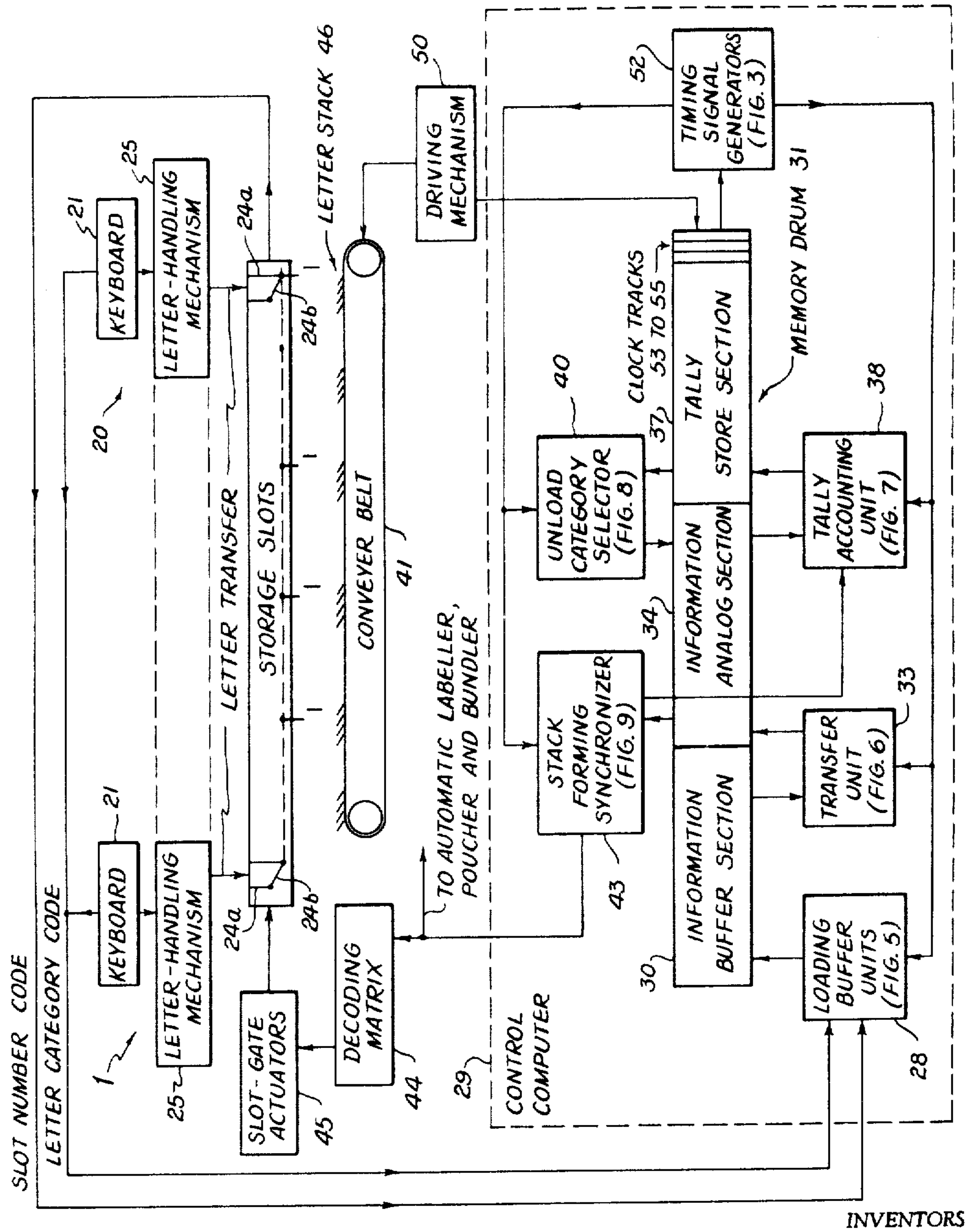
FIG. 1 is a block diagram of an embodiment of the present invention.

The number of sorting stations employed in a particular installation is determined by the volume of sorting to be accomplished. In this embodiment twenty stations are used and sorting stations 1 and 20 are shown in FIG. 1. Each station includes a keyboard 21 for controlling a signal generating mechanism that is generally used in a teletypewriter to develop signal patterns in binary code. An operator, by striking selected keys on the keyboard, transcribes the address of each letter into a category code in accordance with an appropriate scheme list of categories.

The scheme list, in one example, may comprise two hundred direct and secondary categories. A direct category is one that requires no further sorting en route or at the post office of origin, while a secondary category requires further sorting. In this example, the list includes twenty secondary categories, sixteen representing states and four representing groups of states, one hundred and seventy-five direct categories, and five spares.

Each secondary category is encoded in binary in a four position code by means of two characters and a command symbol, represented by an asterisk. New York State, for example, is designated by *-NY. (Note that the second position of the code is blank.) Each direct category is encoded in binary in a four position code by the characters representing a related secondary category and another prefix. Rochester, N.Y., is therefore designated as -RNY. (Note that here the first position of the code is blank.) The number of direct categories assigned to each secondary is determined by the statistical probability of the former.

Figure 2A:
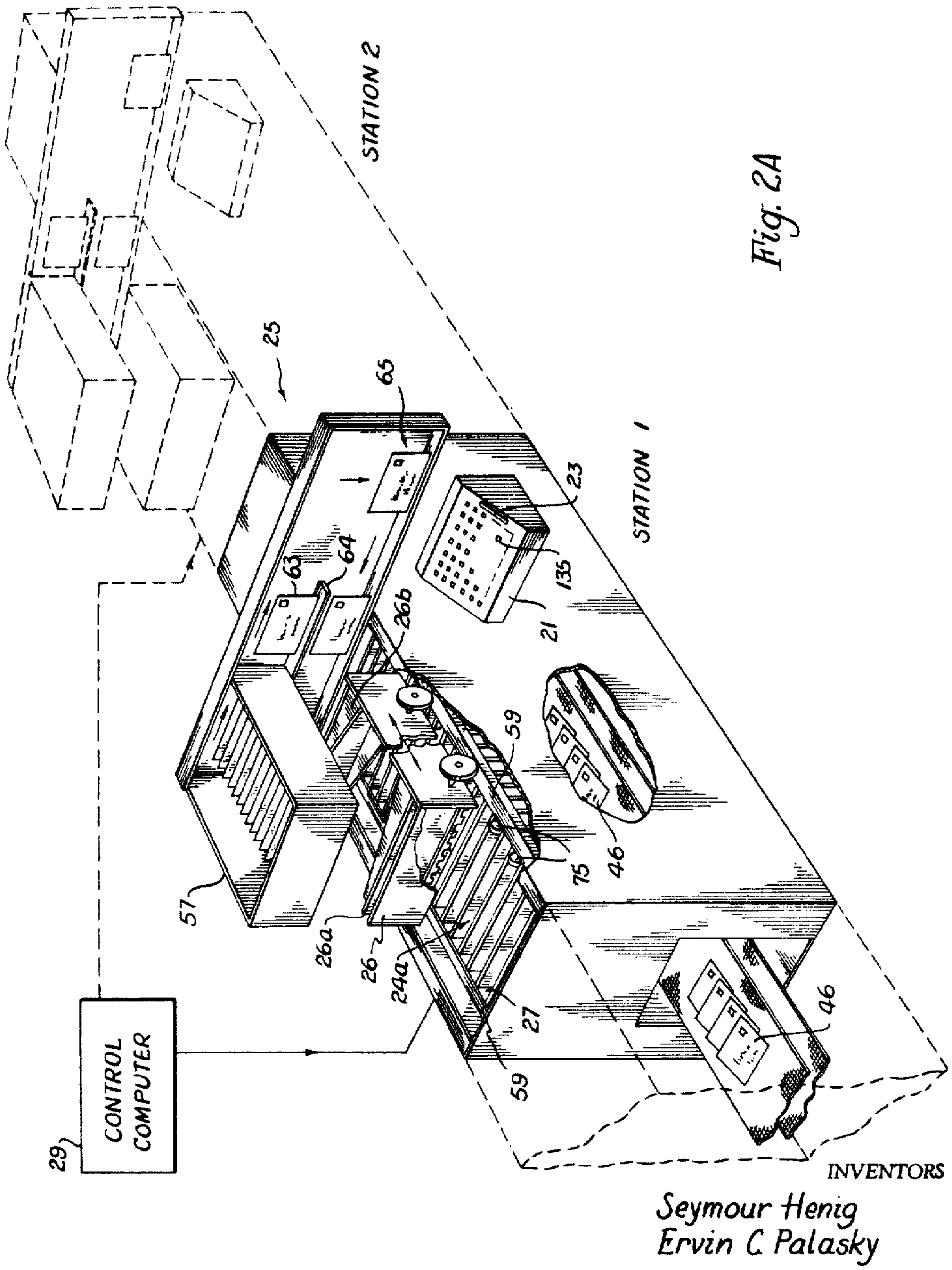
FIG. 2A is a pictorial representation of a typical installation showing a plurality of individual sorting stations arranged to discharge sorted letters on a common conveyor belt.

After observing the address of a letter, an operator generates the related category code by striking the appropriate keys on keyboard 21 (FIG. 2A). When the address is in a direct category, the operator strikes the three characters of the category code, but when the address is a secondary category, the operator stikes the space bar 23 and the two characters of the code. The command code * is pre-recorded in the scheme list categories track 261 (FIG. 4C) and is provided in control computer 29, when required, as indicated below.

After the category code is struck, the letter-handling mechanism 25 is activated and the letter is indexed to a central position with respect to the traverse of shuttle 26 and is dropped into either pocket **26*a* or 26*b*. The shuttle traverses a rack 27 of sorting slots 24*a*** and deposits the letter in the first vacant slot encountered. When the last-mentioned operation is performed, a code representing the number of the slot into which the letter was deposited is generated (FIG. 2C).

Returning to FIG. 1, the letter category code and slot number code are applied to loading buffer units 28 in control computer 29 and are read into the information buffer section 30 of memory drum 31. The codes are then transferred from section 30 through transfer unit 33 to information analog section 34.

The data stored in section 34 is considered to be "information analog," since in this embodiment, the slot number and related letter category code are positioned, side-by-side, in successive sectors of memory drum 31 in the same sequence as the corresponding letters stored in slots **24*a*. It is understood, however, that the codes need not be written on the drum side-by-side so long as each letter category code is provided with a fixed displacement relative to its related number code and the number codes are read out of the memory drum, in the manner described below, in the same sequence as the slots 24*a* are positioned in rack 27**.

Each category code in the scheme list is pre-recorded in certain tracks in the tally store section 37. A threshold code, representing the minimum number of letters required for each category before it is selected for unloading, is also recorded in a track in this section. The tally accounting unit 38 keeps a running tally of the number of letters in each category stored in each slot **24*a*, as indicated by the recordings in analog section 34, and writes this tally in a track in section 37. All the information used to provide self-optimizing inventory reduction is now present in memory drum 31**.

In the operations performed in obtaining optimum inventory reduction, the predominant categories are selected on an alternate basis with a programed category, i.e., the categories in the scheme list are unloaded in turn on an alternate basis with the categories having the greatest number of letters in slots **24*a* when an active unload category is selected. Accordingly, during certain revolutions of memory drum 31, unload category selector 40** performs one of the following operations:

(a) The predominant category, either direct or secondary, is determined and becomes the next active unload category. (Instead of selecting an active unload category code purely by predominance, the selection may be further constrained by a threshold, so that the category code selected is related to a tally code of desired magnitude.)

(b) The magnitude of a tally of a programed, direct category is compared with the magnitude of its recorded threshold. At the same time, the predominant category is determined. If the tally exceeds its threshold, the direct category is selected. If not, the direct category is skipped and the predominant category becomes the next active unload category.

(c) A search is made for the predominant category. Concurrently, a determination is made of the sum of the tallies of a programmed, secondary category and all its associated direct categories, which include those skipped. If the magnitude of the sum exceeds the magnitude of the threshold recorded for the secondary category, the letters in the secondary and related direct categories are unloaded together. If the tally fails to exceed its threshold, the predominant category is selected.

A sequence of the operations just indicated is presented below and explained in detail in connection with Table I.

After selector 40 has determined the next category of letters to be unloaded from slots **24*a*, the code representing this category is written on a track in information analog section 34. Each category code written on this track is compared in stack-forming synchronizer 43 with each category code in the analog section positioned adjacent the number code of the slot containing the letter. When an identity is found, the number code, related to the category code, is read out and passed in binary form, as one output of the stack-forming synchronizer, to decoding matrix 44. The matrix converts the binary code to a pulse on a line connected to one of the slot-gate actuators 45. The energized actuator opens the gate 24*b* of the related slot to drop the letter on the stack 46 forming on conveyor belt 41** (FIG. 2A).

Stack-forming synchronizer 43 instructs the tally accounting unit 38 to discount any letter in an active unload category that is located in a slot **24*a* in advance of the related stack being formed on conveyor belt 41**. This is done so that the letters, that are dropped in slots positioned in advance of the stack, will not affect the tally and therefore the selection of the next active unload category.

Another output of stack-forming synchronizer 43 comprises each active unload category code, which is directed to a conventional system, not shown, that is used to bundle, pouch and label the stacks of letters formed on conveyor belt 41.

The driving mechanism 50 comprises a synchronous motor for the memory drum 31 and a separate sychronous motor for conveyor belt 41. The motors are driven from the same source, and the motor for the belt is provided with a gear reduction arrangement so that the time required for a reference point on the belt to traverse the width of one slot **24*a*, plus a fixed time interval, is equal to the time required for one revolution of memory drum 31**.

The bits engraved in clocks 53 to 55 are used to drive the timing signal generators 52, which provide the timing signals for control computer 29, as will be explained in detail further on.

*Letter handling and encoding (FIGS. 2A to 2C)*

Each sorting station 1 to 20, as shown in FIG. 2A, includes an alpha-numeric keyboard 21, a letter-handling mechanism 25, a letter tray 57, and a rack 27.

Figure 2B:
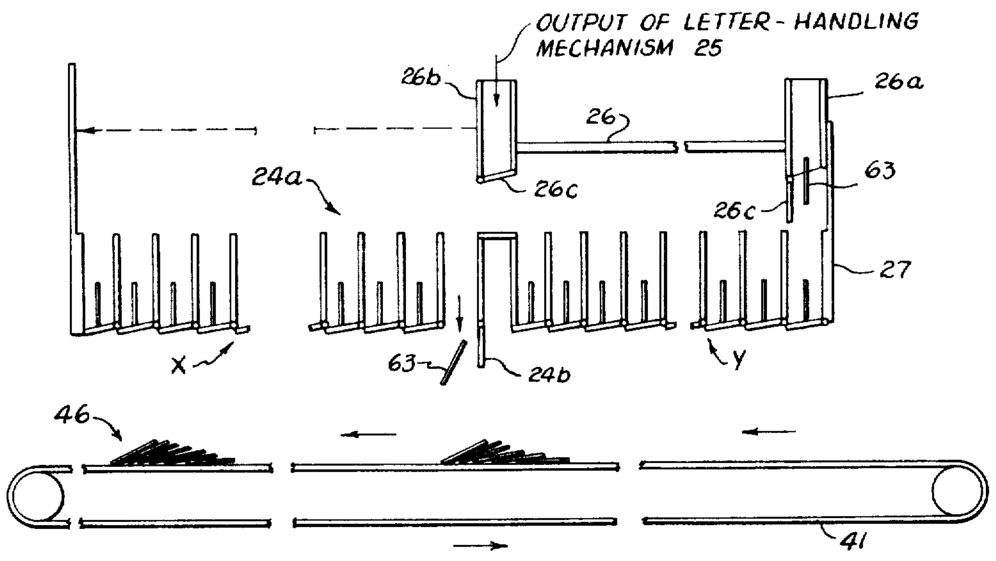
FIG. 2B is a side view of a shuttle, rack of slots and the conveyor belt that are employed at each station.
Figure 2C:
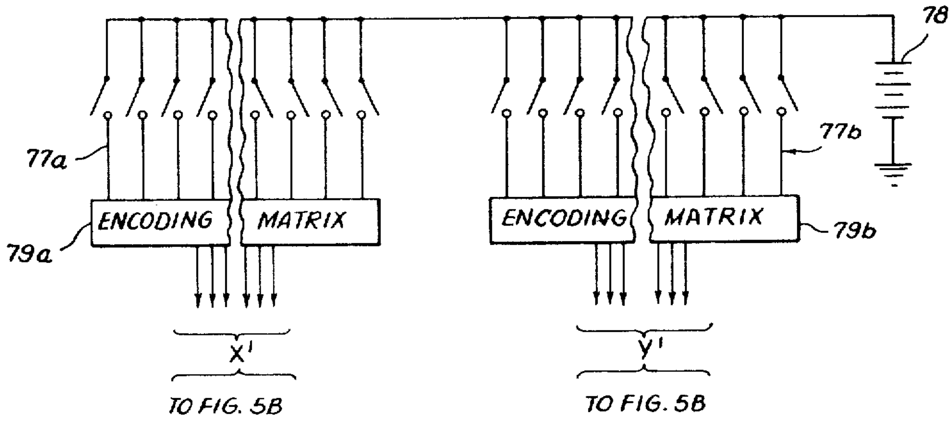
FIG. 2C discloses the encoding matrices utilized at each station in developing the binary numbers that represent the slots in FIG. 2B.

The rack is divided by partitions into one hundred and twenty sorting slots **24*a*, each provided with a gate 24*b*, as illustrated in FIG. 2B. The tracks 59 are located on the rack (FIG. 2A) and shuttle 26, slidably mounted on the tracks, is adapted to be reciprocated in the directions indicated by the arrows, so as to traverse the sorting slots 24*a***.

The letter-handling mechanism 25 provides a means for sequentially feeding letters individually from letter tray 57 for visual inspection by an operator and then to shuttle 26. Under selective control of the operator, a letter 63 is fed from tray 57, and is then translated along trackway 64 in the direction of the arrows to an inspection position 65, and from there to one of the pockets **26*a* or 26*b*** in the shuttle. For more specific details of the letter-handling mechanism, reference is made to the above-mentioned patent.

As described in the above patent, the letter-handling mechanism 25 is at a medial position with respect to the length of rack 27. The shuttle 26 is preferably made one-half the length of the rack and is translated from one end of the rack to the opposite end. In either position, one of the pockets **26*a* or 26*b* in the shuttle will be in registry with the output of the letter-handling mechanism, as shown in FIG. 2B. In other words, the shuttle has two initial positions; one in which pocket 26*a* is at the middle of rack 27 and pocket 26*b* is at the left side of the rack; the other in which pocket 26*b* is at the middle of the rack, pocket 26*a* is at the right end of rack 27. In this manner, after a given traverse in which the letter has been discharged from one pocket to an appropriate slot 24***a*, the other pocket is automatically positioned for receiving a letter from the letter-handling mechanism. It will be obvious that such construction precludes the need for causing the shuttle to retraverse the full length of the storage bin.

Flag assemblies 75 are serially arranged in a wall of the rack 27, as shown in FIG. 2A. Each assembly is mounted for vertical reciprocation within a chamber positioned at the end of a slot 24*a* and includes a plunger that controls the position of a gate 24*b* illustrated in FIG. 2B. The construction and operation of a typical flag assembly is described in detail in the above patent and, for the purposes of this disclosure, is briefly set forth as follows. As shuttle 26 traverses the length of the rack 27, the flag assembly 75 of the first vacant slot 24*a* will be elevated and will be contacted by the pin of a bell crank positioned on the shuttle. The flag, together with its plunger will be displaced downward. Concurrently with such downward displacement of the plunger, the bell crank rotates to pivot a gate 26*c* that is mounted on either pocket 26*a* to 26*b*, permitting the letter 63 carried in the pocket to be discharged into a slot 24*a* associated with the activated flag assembly. In this manner, a letter is transferred from letter tray 57 to shuttle 26 and from there to the first vacant slot in rack 27.

When the flag assembly 75 and its associated plunger is depressed, a switch is closed, as indicated in the above patent. Each switch 77*a* or 77*b* is illustrated in FIG. 2C and in this embodiment, is of a type, well known in the art, that will provide a momentary pulse when closed by the plunger and no pulse when opened by the plunger.

When the flag assembly of a slot 24*a* in rack-half X (FIG. 2B) is depressed, indicating that a letter will be deposited in the slot, a related switch 77*a* (FIG. 2C) is closed and a pulse is applied from potential source 78 through the switch to encoding matrix 79*a*. The encoding matrix generates signal X′ in a six-bit binary code. Likewise, when a flag assembly in a slot 24*a* in rack-half Y is depressed, an associated switch 77*b* is closed and a pulse is transmitted to encoding matrix 79*b*. The latter matrix develops signal Y′ in a six-bit binary code. Each signal X′, Y′ represents the number of the slot in rack-half X or Y, respectively, into which the letter 63 will be deposited. The outputs of the encoding matrices are directed to the loading buffer units 28 in FIG. 1, which are shown in detail in FIGS. 5A and 5B.

*Timing signal generators (FIG. 3)*

Figure 3:
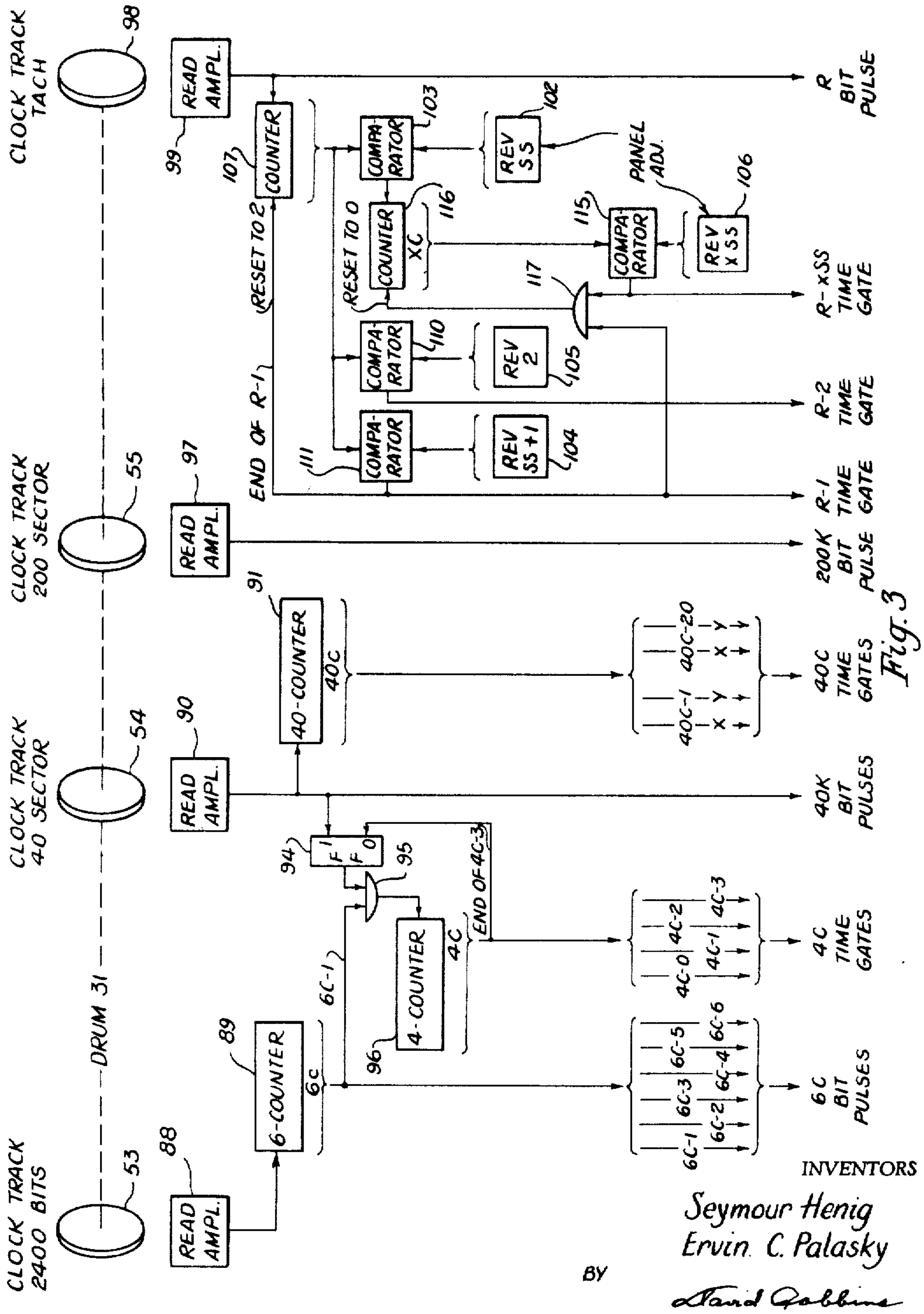
FIG. 3 discloses in greater detail the timing signal generators shown as a rectangle in FIG. 1.

The timing signal generators 52, shown in detail in FIG. 3, provide the timing signals that maintain the various components of control computer 29 in synchronization.

With reference to FIG. 3, there are twenty-four hundred bits engraved in clock track 53. This track is continually sensed by read amplifier 88 whose output is applied to 6-counter 89. The counter has six outputs, alternately activated, to generate bit pulses 6C in a continuous sequence.

Clock track 54 contains forty equally spaced, engraved bits dividing the memory drum 31 into forty equal sectors, each sixty bits long. The start of each sector is aligned with one of the bits engraved on track 53. (See FIGS. 4A, 4B.) The read amplifier 90 senses track 54 and applies pulses to 40-counter 91, which provides time gates 40C. The latter comprise time gates 40C–1X through 40–20X and 40–1Y through 40C–20Y. Each time gate appears on a separate line; and each time gate, ending in a number and X, is generated before the time gate ending in the same number and Y.

Whenever a pulse is applied to an input terminal marked "1" on a flip-flop, in accordance with the notation used herein, the flip-flop is turned on, and whenever a pulse is applied to an input terminal marked "0," the flip-flop is turned off.

Read amplifier 90 feeds forty equally spaced pulses to terminal 1 of flip-flop 94. On coincidence between the output of flip-flop 94 and pulse 6C–1 in and-gate 95, a signal is applied to 4-counter 96 which is then advanced. The output 4C of this counter comprises time gates 4C–0 to 4C–3, each appearing on a separate line.

The two hundred bits engraved on clock track 55 divide memory drum 31 into two hundred sectors, each having space for twelve bits. (See FIG. 4C.) Each bit in these sectors is aligned with a bit in clock track 53. Track 55 is sensed by read amplifier 97 to obtain 200K bit pulses. Track 98 forms a tach clock containing one pre-recorded bit or fiducial mark which is aligned with a bit in each of clock tracks 53 to 55. The latter track is sensed by read amplifier 99, whose output is applied to counter 107 to count the revolutions of the memory drum 31. The read amplifier also provides an R-bit pulse during each revolution of the drum.

Each of the devices shown in a box, containing "REV" and other notations, is an arrangement, well known in the art, that provides a signal representing a number in binary code. Thus, when a count of four is preset in device 102, there will be an output from comparator 103 each time a count of four appears in counter 107. The output of device 102 determines the pitch between letter stacks, i.e., the distance between stacks 46 in FIG. 1, expressed as a multiple of the width of one slot 24*a*.

The outputs of counter 107 and device 105 are compared in comparator 110 so that on the occurrence of an identity, time gate R–2 is generated. Likewise, on the occurrence of an identity in comparator 111 between the outputs of counter 107 and device 104, time gate R–1 is generated. The trailing edge of time gate R–1 resets counter 107 to a count of 2.

The output of comparator 103 advances counter 116 to develop signal *x*C, representing a multiplier of the number of revolutions of memory drum 31 that is preset in device 102. Signal *x*C and the output of device 106 are directed to comparator 115, which, on the occurrence of an identity, provides time gate R–*x*SS. Time gates R–1 and R–*x*SS are transmitted to and-gate 117 whose output resets counter 116 to 0.

Thus, if 100 is set in device 102, if 101 is set in device 104, and if 2 is set in devices 105 and 106, then each time that 101 is recorded in counter 107, time gate R–1 is developed by comparator 111. Each time that counter 107 is reset to 2, time gate R–2 is generated by comparator 110, and each time that counter 116 records 2, or every 200th revolution of memory drum 31, time gate R–*x*SS is generated by comparator 115. (See Table I.)

Devices 102 and 106 are provided with suitable panel adjustments, not shown in the drawings.

The manner in which the various timing signals just described are used to synchronize the units of control computer 29 will become apparent as the description proceeds.

*The loading buffer units (FIGS. 5A, 5B)*

Figure 5:
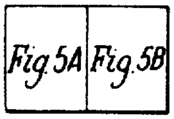
Figure 5A:
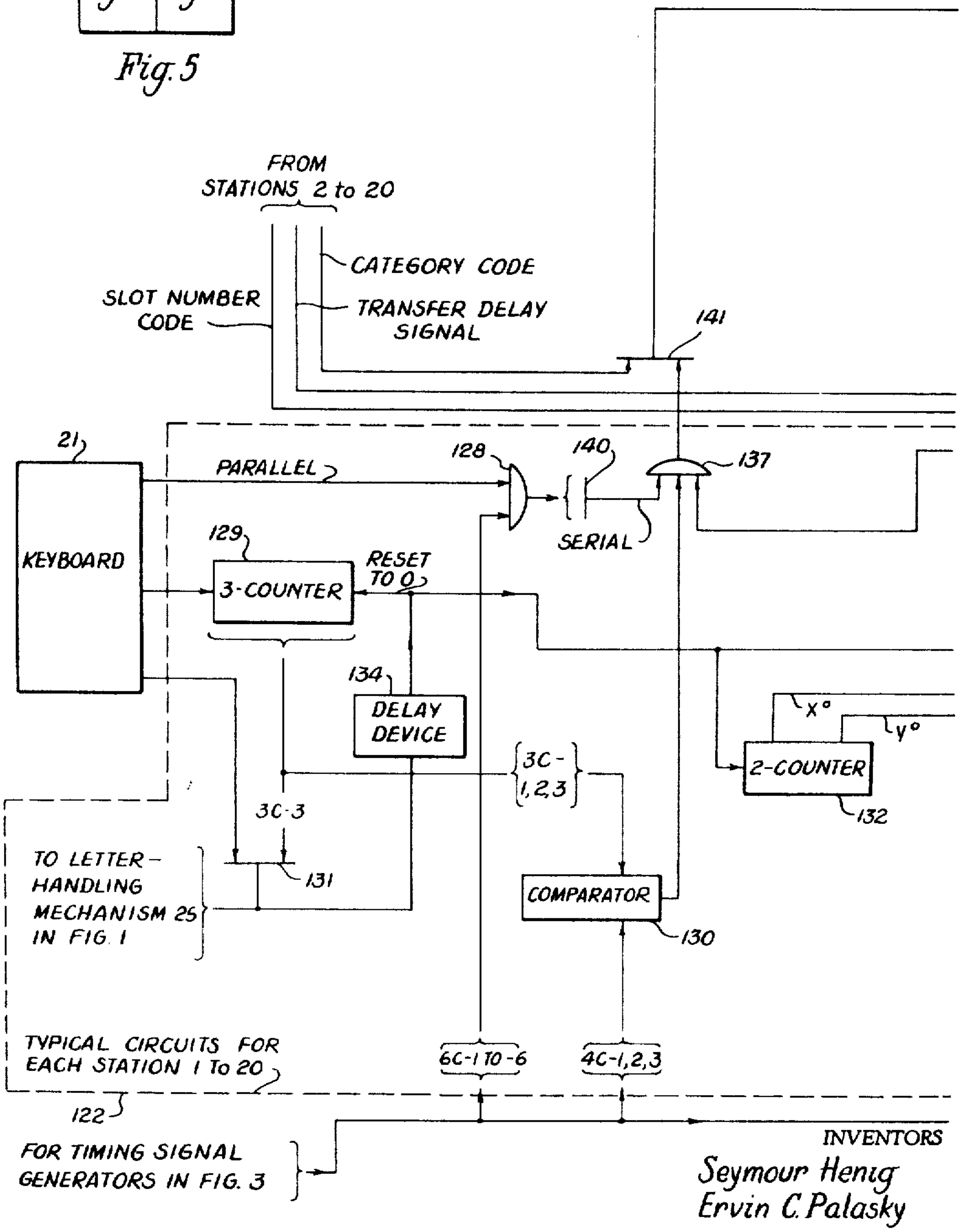
FIGS. 5A and 5B are assembled.
Figure 5B:
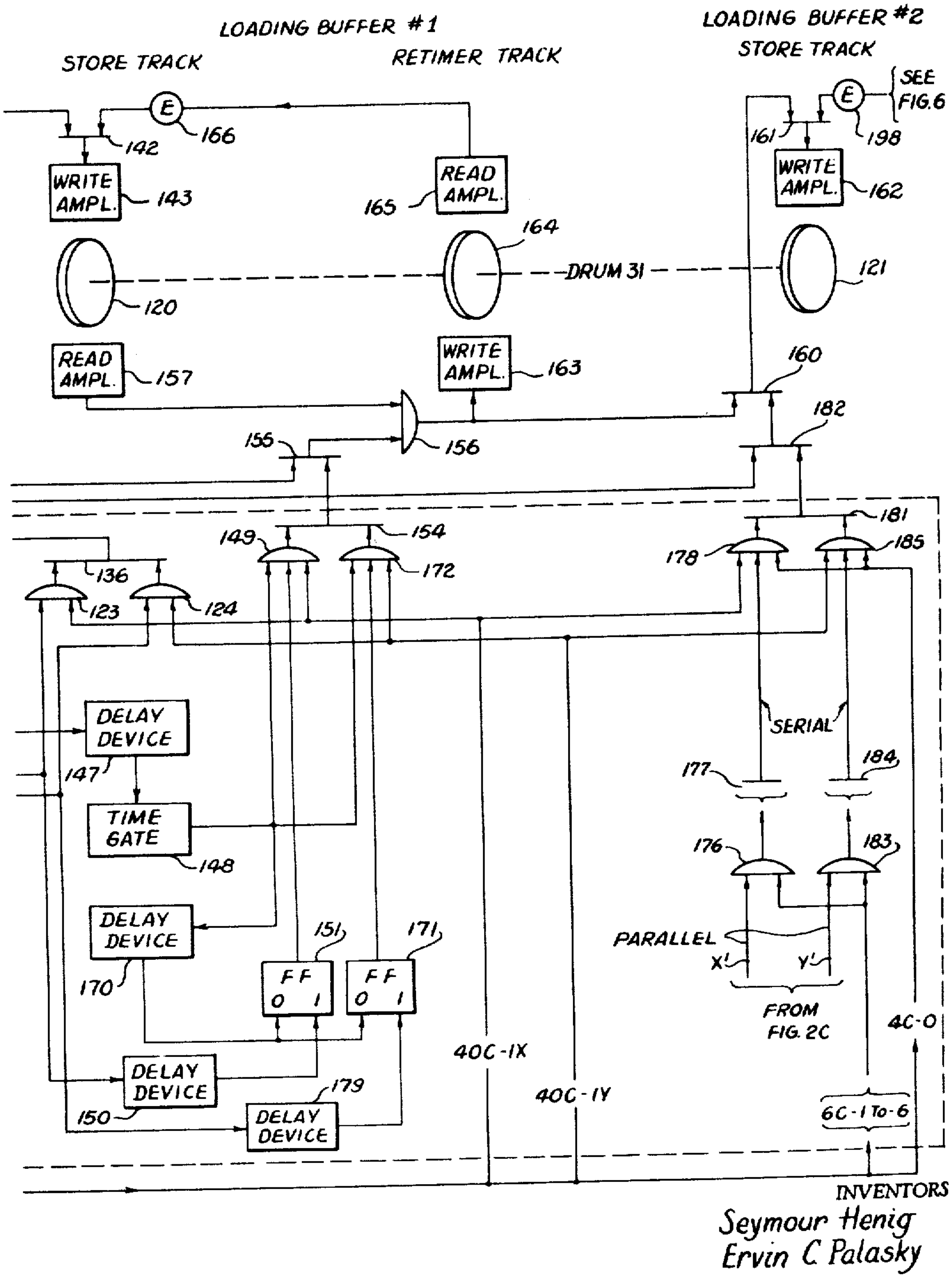

The loading buffer units 28, shown in detail in FIGS. 5A, 5B, accept letter category and slot number codes as they are aperiodically generated at the sorting stations 1 to 20 and effect the recording of these codes in loading buffer tracks 120 and 121. These tracks are located in the information buffer section 30 in FIG. 1.

The circuits in dotted box 122 are typical for each sorting station and are explained in detail in conjunction with the operation of station 1.

It will be recalled from FIG. 3 that time gates 40C divide memory drum 31 into forty sectors; two sectors are assigned to each sorting station 1 to 20. The sectors for station 1 are delimited by time gates 40C–1X and 40C–1Y, the sectors for station 2 by 40–2X and 40C–2Y etc. The time gates 40C–1X and 40C–1Y are applied to and-gates 123 and 124, respectively.

When a key is struck on keyboard 21, a binary code, representing a character in the letter category code, is applied in parallel form to 128, which denotes six and-gates.

Each time a key is struck, 3-counter 129 is advanced. The output of 129 is denoted by 3C, comprises signals 3C–1 to –3 and is fed to comparator 130. On the third count of counter 129, signal 3C–3 is passed through or-gate 131 to the letter-handling mechanism 25, which then moves the letter from inspection position 65 (FIG. 2A) to shuttle 26. The output of or-gate 131 is branched through delay device 134 to reset the counter to 0.

It is apparent that the function of counter 129 is to limit a category code to three characters. If another scheme list is used that contains a category code having a blank in the third and/or fourth position, such as _A_ _, the operator strikes the character or characters of the code and then the end of category key 135 (FIG. 2A). A signal is then applied through or-gate 131 to reset counter 129 and to the letter-handling mechanism 25 to move the letter away from the operator inspection position.

Assume that just before the example described below, a letter was deposited in rack-half Y. In encoding the category of this letter, 2-counter 132 was advanced to apply signal X· through delay device 150 to terminal 1 of flip-flop 151, so that during the appropriate time interval in the example just below, the flip-flop is turned on and applies a signal to and-gate 149. Signal X· is also branched to and-gate 123.

Now assume that a direct letter category code _RNY is struck by the operator on keyboard 21. Because shuttle 26 is in the position shown in FIG. 2B, the letter associated with the category code, just struck, will be deposited in the first empty slot **24*a*** in rack-half X.

When the R key is struck, a signal in binary code is applied in parallel form to and-gates 128. On the occurrence of time gate 40C–1X, which marks the start of the one-fortieth sector of tracks 120 and 121 shown in FIG. 4A, the output of and-gate 123 is directed through or-gate 136 to and-gate 137. On coincidence of time-gate 4C–1 and signal 3C–1 in comparator 130, the output of the comparator is applied to and-gate 137. The next sequence of time gates 6C–1 to –6 enables and-gates 128 and the category code R passes in serial form through or-gate 140, and-gate 137, or-gates 141 and 142 to the write amplifier 143. The six bits of code are then written in the space allocated to character No. 1 in track 120. (See FIG. 4A.) The first section of the one-fortieth sector consisting of six bits in track 120 is reserved to permit a related slot number to be written first when the information recorded in the remaining sections of this sector is transferred to track 121.

After the N key is struck, on the occurrence of time gates 40C–1X, 6C–1 to –6, and the coincidence of signal 3C–2 and time gate 4C–2 in comparator 130, the six-bit binary code representing N is recorded in the section of store track 120 marked "character No. 2." Likewise, after Y is struck, on the occurence of the last-mentioned time gates and the coincidence of 3C–3 and 4C–3 in the comparator 130, the code representing Y is written in the section of the track marked "character No. 3."

Figure 4A:
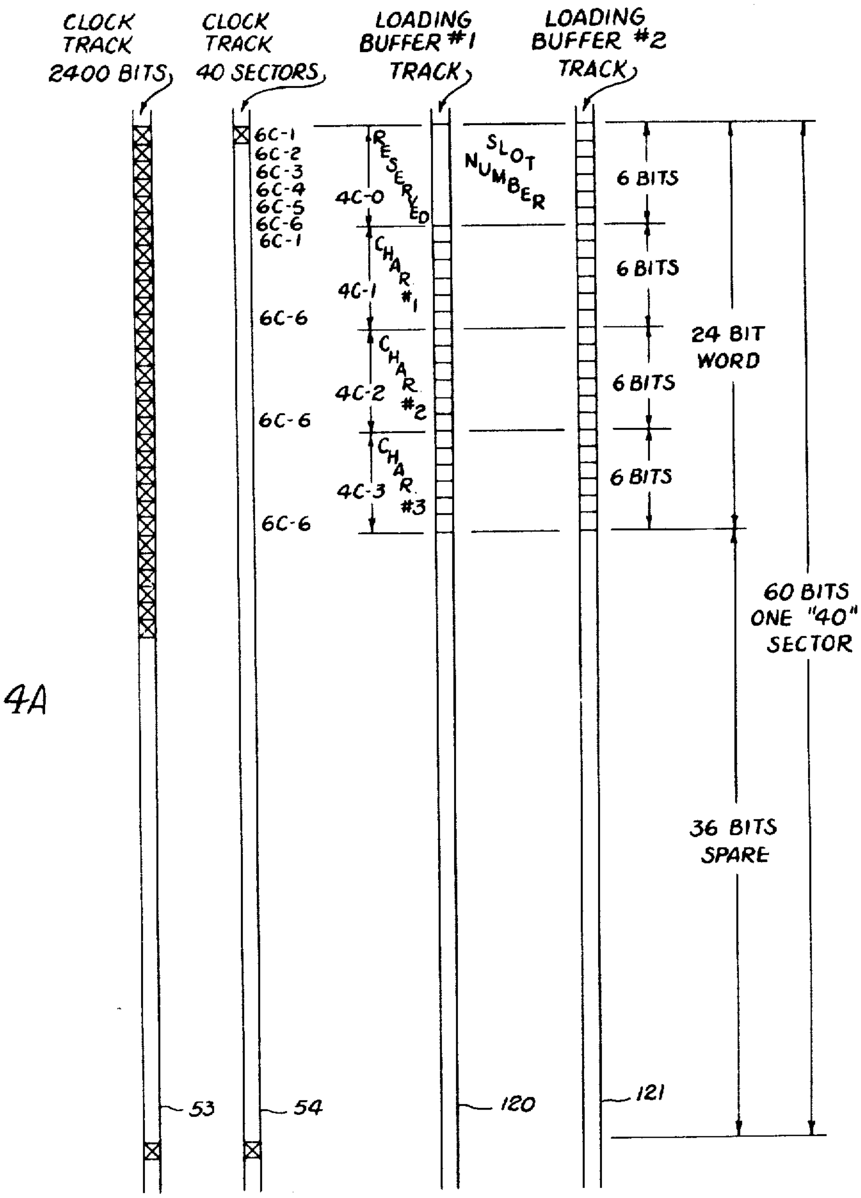
FIGS. 4A to 4D represent portions of various tracks of the memory drum in FIG. 1.
Figure 4B:
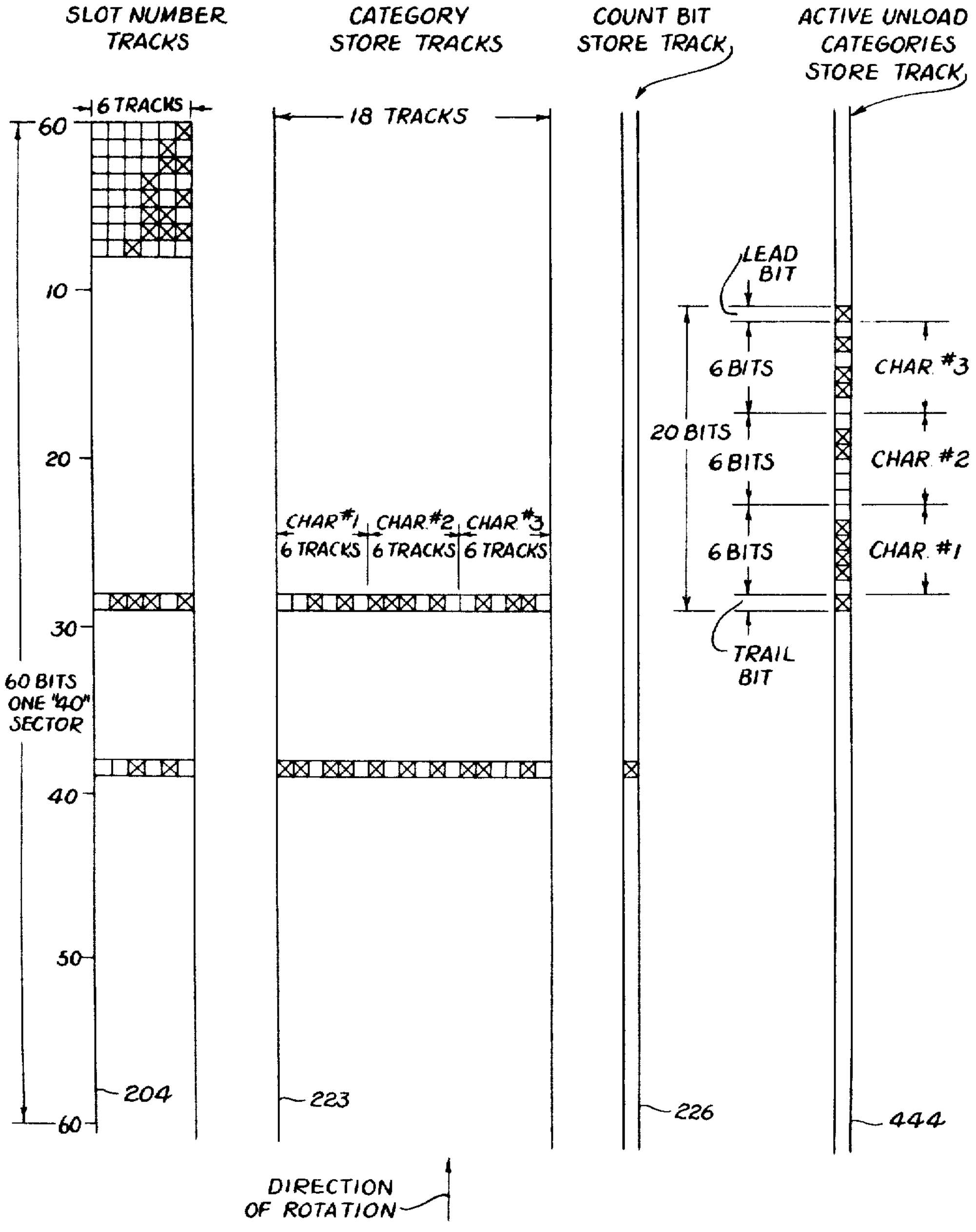

When the operator depresses the Y key, counter 129 generates signal 3C–3, which is transmitted through or-gate 131, delay devices 134, 147 and time gate 148 to and-gate 149. Since signal X· was sent through delay device 150 to terminal 1 of flip-flop 151, the latter applies a signal to and-gate 149. On the occurrence of time gate 40C–1X, the latter and-gate is enabled and a transfer delay signal is applied through or-gates 154 and 155 to and-gate 156. Read amplifier 157 then reads track 120 and applies the category code RNY through and-gate 156 and or-gates 160 and 161 to write amplifier 162. The latter records the code bit-by-bit in the sections of track 121 reserved for character Nos. 1 to 3, as represented in FIG. 4A.

The category code is branched from and-gate 156 to the write amplifier 163 and is thereby recorded on retimer track 164. The code is read by read amplifier 165 from the retimer track, is converted to an erase signal in eraser 166, and is applied through or-gate 142 to write amplifier 143. Thus, within one revolution of memory drum 31 after the category code is shifted from track 120 to track 121, the code just read from the former track is erased.

The retimer track method, just described, provides an erasing means that is independent of the speed setting of memory drum 31, and this means is used where applicable in other functions of control computer 29. An eraser head that clears the retimer tracks for immediate reuse is positioned, but not shown in the drawings, between the read and write amplifiers associated with each retimer track.

The output of gate 148 is branched through delay device 170 to terminal 0 of flip-flop 151, turning the flip-flop off.

The value of delay devices 150 and 179 are selected so that one of the and-gates 149, 172 may be enabled only after the other has transmitted a transfer signal through or-gates 154 and 155 to and-gate 156. Time gate 148 and delay device 134 have values dependent upon the speed of rotation of memory drum 31.

It will be recalled that the category codes of the letters deposited in rack-half X are recorded in sequence in a single assigned one-fortieth sector of track 121. Likewise, the categary codes of letters deposited in rack-half Y are written in sequence in another single assigned sector of track 121. The codes for each rack-half are recorded on an alternate basis. The value of delay device 147 is selected to insure that the previous category code has been read out of track 121 before the present code is recorded in the same assigned sector of the track.

When, as set forth above, the operator depresses the Y key, counter 129 is advanced and signal 3C–3 is generated and applied through or-gate 131 and delay device 134 to reset the counter to 0. The signal 3C–3 is branched to the letter-handling mechanism 25, thereby starting the letter moving away from the operator's inspection position 65. The letter is deposited in pocket **26*b* of shuttle 26 and then in the first empty slot of rack-half X. The shuttle is then moved in FIG. 2B so that pocket 26*a* is positioned to receive a letter from the letter-handling mechanism. Signal 3C–3 is branched to 2-counter 132 to advance the counter which then develops signal Y·, thereby permitting the category code for the next letter to be written in the one-fortieth sector associated with time gate 40C–1Y**, as described below.

As the letter is deposited into slot **24*a*, one of the switches 77*a* is closed and a pulse is applied to the encoding matrix 79*a* in FIG. 2C. The signal X′ appearing in the output of the matrix represents the number of the slot in binary code and is applied in parallel form to 176, which designates six and-gates in FIG. 5B. When time gates 6C–1 through –6 are applied to and-gates 176, the slot number code is passed through or-gate 177 in serial form to and-gate 178. Time gates 40C–1X and 4C–0 are also applied to this and-gate. When there is coincidence among all three signals, the output of and-gate 178 is sent through or-gates 181, 182, 160, and 161 to write amplifier 162. The slot number code is now written serially in its reserved section in track 121. (See FIG. 4A.) The category code _RNY is recorded, as stated above, in the sections of this track reserved for character Nos. 1 to 3**.

As indicated above, upon the completion of the category code for the letter headed for rack-half X, signal Y· is applied to and-gate 124. On the occurrence of time-gate 40C–1Y, the output of and-gate 124 is passed through or-gate 136 to and-gate 137 to enable the category code for the next letter to be written in track 120. (This letter will be deposited in rack-half Y.)

Signal Y· is also branched through delay device 179 to terminal 1 of flip-flop 171 and the output of the flip-flop is applied to and-gate 172. At the appropriate time, as described in the example presented above, the output of the latter and-gate, which is the transfer delay signal, will enable and-gate 156 to transfer the letter category code from track 120 to track 121.

Further, signal Y', representing the number of the slot in binary form, is applied in parallel form to the six and-gates 183. On the occurrence of time gates 6C–1 to –6, signal Y' is passed through or-gate 184 in serial form to and-gate 185. On coincidence of the latter signal and time gates 40C–1Y, 4C–0 in and-gate 185, the slot number code is passed through or-gates 181, 182, 160, and 161 to write amplifier 162 and is recorded in the section of track 121 reserved for the slot number code.

The above examples were given for sorting station 1. When a station 2 to 20 is activated, a slot number code, a transfer delay signal and a category code are applied from the corresponding control circuits in dotted box 122 in that station to or-gates 182, 155 and 141, respectively.

*Transfer unit (FIG. 6)*

Figure 6:
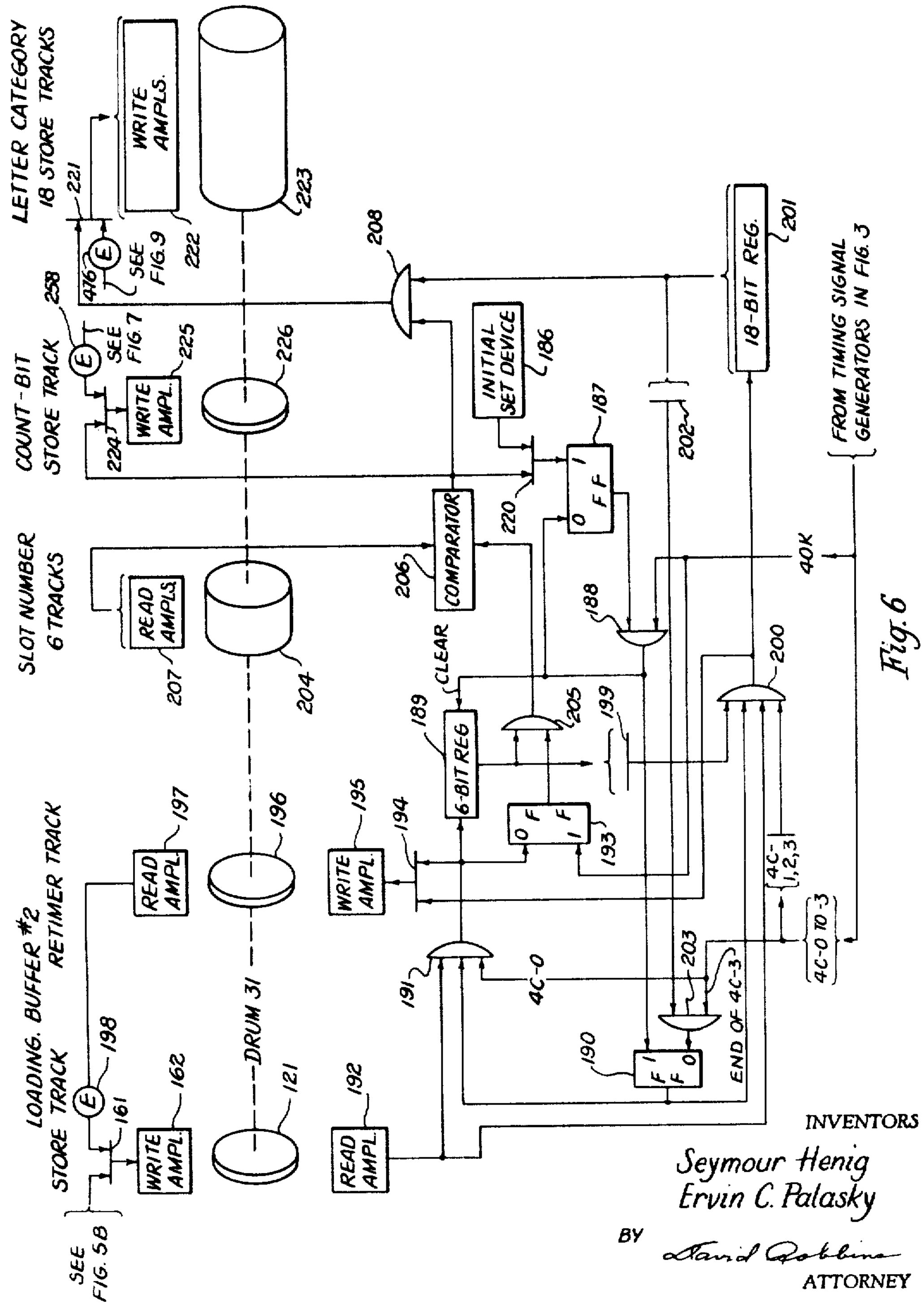
FIG. 6 is a circuit diagram of the transfer unit shown in FIG. 1.

The circuit in FIG. 6 represents the transfer unit 33 in FIG. 1, whose function is to transfer each category code in information store section 30, namely track 121, to a position adjacent its related slot number in the information analog section 34.

When the sorting machine is turned on, initial set device 186 is adjusted on the panel to generate a signal that passes through or-gate 220 to terminal 1 of flip-flop 187, turning the flip-flop on. On coincidence of the output of the flip-flop and a 40K pulse in and-gate 188, the output of this and-gate clears 6-bit register 189 and turns on flip-flop 190. The latter, in turn, applies a signal to and-gate 191. Since read amplifier 192 reads track 121 continuously, when time gate 4C–0 is applied to the latter and-gate, the information relating to a slot number is passed through the and-gate in serial form to register 189.

Flip-flop 193 is turned on by the 40K pulse, just mentioned, and is turned off by virtue of a branch of the output of and-gate 191 that is applied to terminal 0 of the flip-flop.

The information in the output of and-gate 191 is also branched through or-gate 194 to write amplifier 195 and is written on retimer track 196. The latter track is sensed by read amplifier 197, whose output is converted to an erase signal in eraser 198. The erase signal is passed through or-gate 161 to write amplifier 162 where it is used to erase from track 121 the slot number code just recorded in register 189.

An output of register 189 is passed through or-gate 199 to and-gate 200. Since time gates 4C–1 to –3 and the output of flip-flop 190 are also applied to this and-gate, after the slot number is recorded in register 189, the related letter category code is read out of track 121 and is passed through and-gate 200 in serial form to 18-bit register 201.

The information in tracks 204 is retarded from the information in track 121 by one-fortieth revolution of memory drum 31. Thus, during on-fortieth revolution of the drum, a slot number code is read out of track 121 and is stored in register 189, and during the following one-fortieth revolution, the contents of the register is compared with each slot number code read out of tracks 204.

More specifically, during the one-fortieth revolution of memory drum 31 when a number code is shifted bit-by-bit into register 189, the code is branched to terminal 0 of flip-flop 193. The flip-flop is turned off, blocking the six and-gates 205, so that a comparison cannot be made in comparator 206 between the code in register 189 and the slot number codes read from tracks 204. After the code is stored in register 189, the next 40K pulse, marking the start of the next one-fortieth revolution of the drum, is transmitted to terminal 1 of flip-flop 193, turning the flip-flop on to enable and-gates 205. The code in register 189 is then sent through and-gates 205 to comparator 206. During this one-fortieth revolution, each slot number code, pre-written in tracks 204, is sensed by read amplifiers 207 and applied to comparator 206. When an identity is obtained in the comparator, a signal is applied to 208, which designates eighteen and-gates. This signal enables and-gates 208 to pass the category code stored in register 201 through eighteen or-gates 221 to write amplifiers 222. The category code is then written in parallel form in the eighteen tracks designated by 223, and on line with the related number code in tracks 204. (See FIG. 4B.)

The output of comparator 206 is branched through or-gate 224 to the write amplifier 225 to record a "1" on count-bit track 226, adjacent to the category code just written into tracks 223. (See FIG. 4B.) This indicates that a category code has been recorded in tracks 223, which as yet has not been tallied.

The output of comparator 206 is also branched through or-gate 220 to terminal 1 of flip-flop 187 to turn the flip-flop on and thereby send a signal to and-gate 188. Upon the occurrence of the next 40K pulse, the output of this and-gate clears register 189, turns flip-flop 190 on and flip-flop 187 off.

Figure 4C:
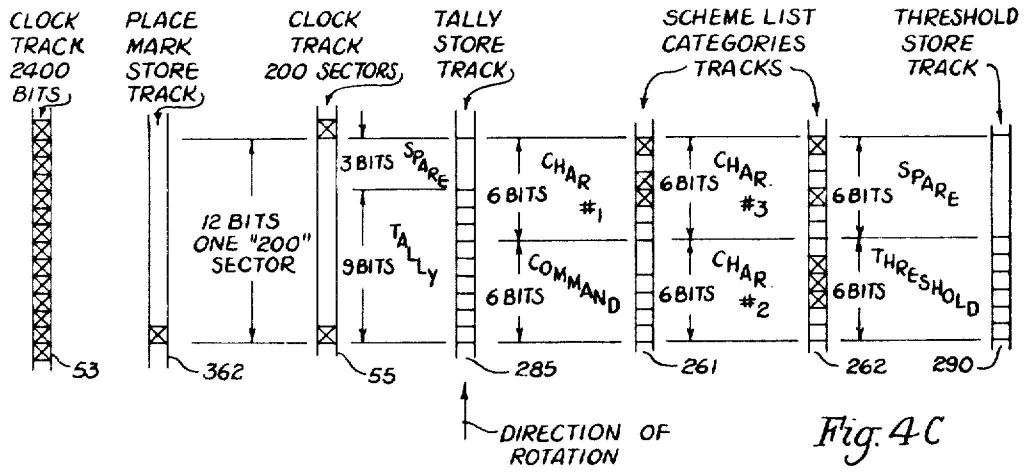
Figure 4D:
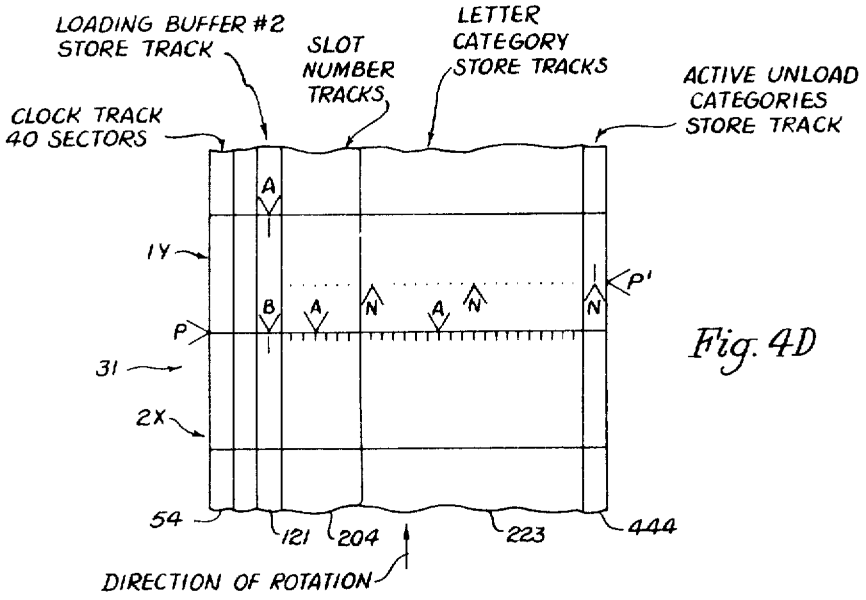

At this point, it is convenient to present with the assistance of FIG. 4D, a brief summary of the operation of the transfer unit 33 in FIG. 6. Sector 1Y of memory drum 31 is assigned to the second rack-half or rack-half Y of station 1, while sector 2X is assigned to the first rack-half or rack-half X of station 2. The first 40K pulse, referred to above, marks the start of sector 1Y. As the drum rotates in the direction indicated in the figure, this sector passes the alignment point P and the slot number and letter category codes designated as A are read out of track 121 and are recorded in registers 189 and 201, respectively. The second 40K pulse, referred to above, marks the end of 1Y and the start of sector 2X. As this sector traverses alignment point P, an identity is found in comparator 206 between the slot number code recorded in register 189 and one of the sixty number codes pre-recorded in tracks 204. The output of the comparator enables and-gates 208 to pass the letter category code to write amplifiers 222 which then write the code in store tracks 223.

As sector 2X passes the alignment point P, read amplifier 192 reads the category and number codes designated by B in FIG. 4D. However, since flip-flops 187 and 190 are turned off, these codes are blocked by and-gates 191 and 200 and are unable to pass to registers 189 and 201, respectively.

It should be noted that the information concerning a letter in a slot 24*a* of rack-half X or Y, at a particular sorting station 1 to 20, is read out of track 121 during one one-fortieth revolution of the track past the alignment point P. An identity is sought and the letter category code is written into tracks 223 during the succeeding one-fortieth revolution of the tracks. This arrangement is used since the serial read out of track 121 consumes part of the traverse of tracks 223 past the alignment point P. Thus, transfer of information from track 121 to tracks 223 utilizes two adjacent sectors, each of one-fortieth revolution of memory drum 31.

It is posible that an operator at one of the sorting stations 1 to 20 will encode a letter to be deposited into rack-half Y, while simultaneously an operator at the next station will encode a letter to be deposited into rack-half X. Assume that the information relating to the two letters is designated by A and B in FIG. 4D. Then, during one revolution of memory drum 31, the information relating to one letter, or A, will be transferred from track 121 to tracks 223, and during the next revolution, the information relating to the second letter, or B, will be transferred from 121 to 223. Accordingly, with the unlikely occurrence of simultaneous encoding by all twenty operators at stations 1 to 20, it would take no more than two drum revolutions to transfer all the letters' information from track 121 to 223. This speed will be at least ten times the operators' combined production rate.

Each output of register 201 is branched to an or-gate 202, so that any information in the register applies a signal through the or-gate to and-gate 203. On coincidence of this signal with the end of time gate 4C–3, the output of and-gate 203 is applied to terminal 0 of flip-flip 190, turning the latter off. This will prevent the transfer of additional information through and-gate 200 to register 201, or through and-gate 191 to register 189. Thus when information is present in the latter registers, it cannot be overwritten by the output of read amplifier 192, which continually reads track 121.

The output of and-gate 200 is branched through or-gate 194 to write amplifier 195 so that the letter category code, just read out of track 121 and recorded in register 201, is erased from the track in the same fashion as the related slot number code.

The six tracks 204, located in information analog section 34, contain the numbers, pre-written in parallel form, of all the slots in sorting stations 1 to 20. Each station is assigned two "40" sectors of tracks 204 and each sector contains the slot numbers of either rack-half X or Y positioned at that station. In this embodiment, each rack-half comprises sixty slots and each "40" sector of tracks 204 contains sixty slot number codes, as illustrated for one sector in FIG. 4B.

*Tally accounting unit (FIG. 7)*

Figure 7:
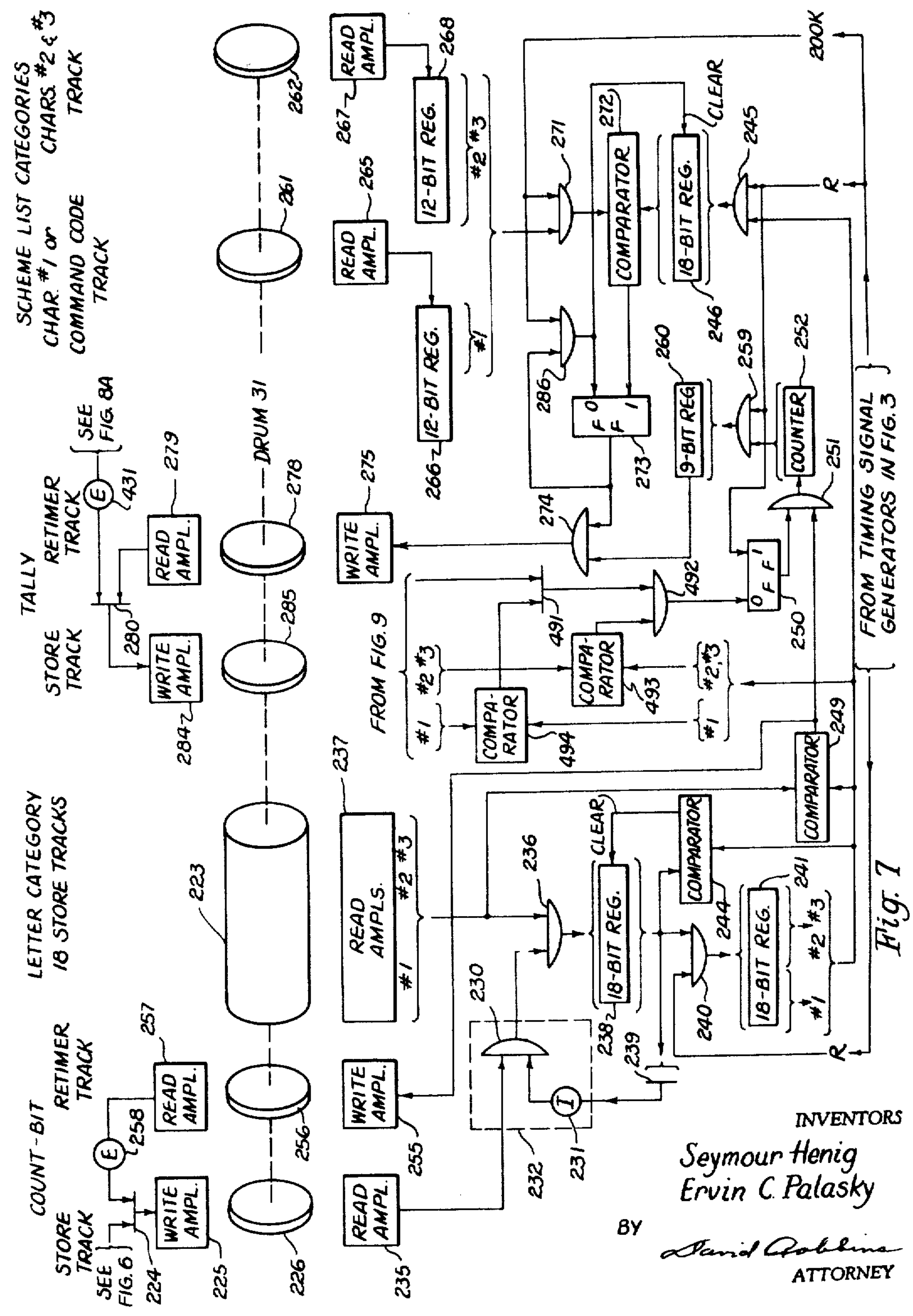
FIG. 7 is a circuit diagram of the tally accounting unit represented as a rectangle in FIG. 1.

The circuit in FIG. 7 is the tally accounting unit 38 in FIG. 1, which is assigned the function of keeping a running inventory of the number of letters in each category stored in slots **24*a*. Because the stack-forming synchronizer 43, described in detail below, searches the information in analog section 34 by category, an applicable letter will unload to its stack as soon as the latter arrives under the letter's slot without regard to the letter's accounting. Therefore, to keep the desired accounting, a letter is disregarded when it is in an active unload category and is positioned in a slot in advance of the category's stack, forming on conveyor belt 41**.

With reference to FIG. 7, the combination of and-gate 230 and inverter 231 comprise and-not-gate 232. Thus, when a bit is not applied to the input of inverter 231, a "1" can appear in the output of and-not-gate 232, and when a bit is applied to the input of inverter 231, a "0" appears in the output of 232.

It will be recalled that when a category code is written into tracks 223, a "1" bit is written beside the code in the count-bit track 226. (See FIG. 4B.) The accounting starts when read amplifier 235 reads a bit from this track. The bit is transmitted through and-gate 230 to the eighteen and-gates 236, while at the same time, read amplifiers 237 sense tracks 223 and transmit the letter category code, related to this bit, in parallel form through and-gates 236 to the 18-bit register 238.

When information is present in register 238, its output is passed through or-gate 239 to inverter 231, thereby blocking and-gates 230, 236, so that further information will not be recorded in the register. Thus, any other bits recorded in track 226 are ignored until register 238 is empty.

The contents of register 238 is immediately compared in comparator 244 with the contents of the succeeding 18-bit register 241. Since an equality yields an output which clears register 238, the same category code can not succeed itself in both registers.

On the occurrence of the next R-bit pulse, the category code in register 238 is transferred in parallel form through the eighteen and-gates 240 to register 241. The R-bit pulse is applied to terminal 1 of flip-flop 250, whose output is sent to and-gate 251, which is enabled in the manner indicated below to advance counter 252.

The information in register 241 is branched to comparator 249 and the output of read amplifiers 237 is likewise branched to this comparator. Accordingly, the comparator provides an output signal for each category code in tracks 223 that matches the code in register 241. Each output signal is passed through and-gate 251 to advance counter 252. Because flip-flop 250 is set by the R-bit pulse, the counter will start at the beginning of the revolution of tracks 223 and will tally all the category codes in the tracks that are identical to the code contained in register 241.

In keeping a running inventory of the letters stored in slots **24*a*, all letters in an active unload category, positioned in advance of the related stack 46, forming on conveyor belt 41, are disregarded. This is accomplished by turning off flip-flop 250 to inhibit the count of a category for the remainder of the revolution of memory drum 31** when the code being tallied represents an active unload category. The circuitry used to achieve this result will be set forth in the last few paragraphs of the description of FIG. 9.

When an identity is found in comparator 249, its output is branched to write amplifier 255 and recorded on retimer track 256. This track is sensed by read amplifier 257 whose output is directed to eraser 258, converted to an erase signal, and then passed through or-gate 224 to write amplifier 225. In this way, each bit that is related to the letter category code applied to comparator 249, if present, is erased from track 226.

It should be noted that the erasing of bits from track 226 for a category code continues for a full revolution of memory drum 31, although the tally may be terminated at any point before completion of the revolution.

When the tally is completed, the next R-bit pulse enables the nine and-gates 259 to shift the tally code in counter 252, in parallel form, to the 9-bit register 260. The same R-bit pulse enables 245, representing eighteen and-gates, to transfer the letter category code in register 241 to 18-bit register 246.

From the foregoing, it will be seen that whenever a new letter category code is added to tracks 223, the number of letters in slots **24*a* designated by this category is tallied, a tally code is recorded in register 260, and the category code is recorded in register 246**.

The 200K pulses on track 55 divide this track, as well as tracks 261, 262, 285 and 290 into two hundred sectors, each containing twelve bit-places, as illustrated by one sector in FIG. 4C. Each bit-place in these tracks is in line with a bit in clock track 53. The tracks are rotated in the direction indicated in the figure.

Each sector in track 261 and a related sector in track 262 has pre-written therein one of the category codes of the scheme list. If the scheme list is altered to perform a desired sorting operation, the codes recorded in these tracks are altered accordingly. For each secondary category code, the command code * is pre-written in the 6-bit position of track 261 marked "command." Thus, for *_NY, the command code * and characters N and Y are pre-written in binary form in the positions of tracks 261, 262 marked "command," "character 2" and "character 3," respectively. Likewise, characters Nos. 1, 2, and 3, of a direct category code are pre-written in the positions of the tracks marked "character No. 1," "character No. 2" and "character No. 3," respectively.

Since some of the categories in the scheme list will have very little volume by virtue of their statistical probability, it is desired to control the minimum number of letters that will be stacked in a bundle. This is accomplished, in part, by pre-writing a threshold code, representing the minimum number of letters to be bundled for each category in the first 6-bit position of the sector of track 290 related to the category. (See FIG. 4C.)

Character No. 1 or the command code of each category in the scheme list is read, in sequence, out of track 261 by read amplifier 265, and is shifted bit-by-bit through 12-bit register 266, while character Nos. 2 and 3 are read, in sequence, out of track 262 by read amplifier 267 and are shifted in the same fashion through 12-bit register 268.

When the codes in registers 266 and 268 are complete, a 200K pulse enables the eighteen and-gates denominated by 271 and the contents of the registers is applied to comparator 272. The output of register 246 is also applied to this comparator, so that when the identity is obtained the output signal of the comparator turns on flip-flop 273. The output of the flip-flop enables the tally code in register 260 to pass through and-gate 274 to write amplifier 275. This code is then written on retimer track 278, is read by read amplifier 279, passed through or-gate 280 to write amplifier 284, and is written in its reserved place on track 285 along side the related scheme list category code in tracks 261 and 262. (See FIG. 4C.) Thus, in the operations described below, the tally code and the related scheme list category code may be simultaneously read out of their respective tracks.

The output of flip-flop 273 is branched to and-gate 286, which is enabled by the next 200K pulse to send a signal to terminal 0 of the flip-flop, turning the latter off. A branch of the latter signal clears register 246.

The processing rate of one new category tally per revolution of memory drum 31 at the lowest anticipated drum speed at least equals the maximum average rate at which letters may enter storage slots 24*a*. This process is shortened when, in the course of one revolution, more than one new letter is found for the category being counted.

Figures 8, 8B:
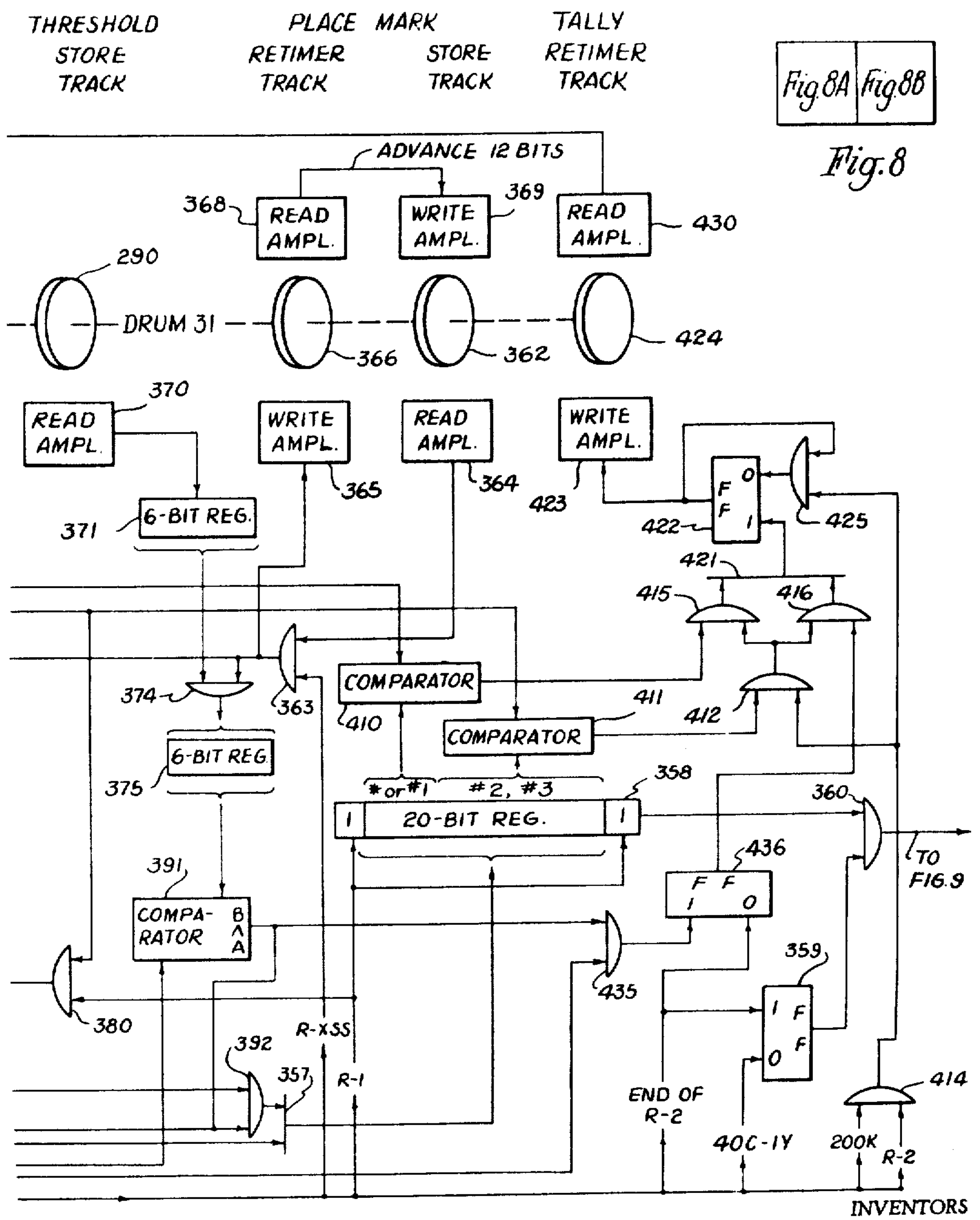
Figure 8A:
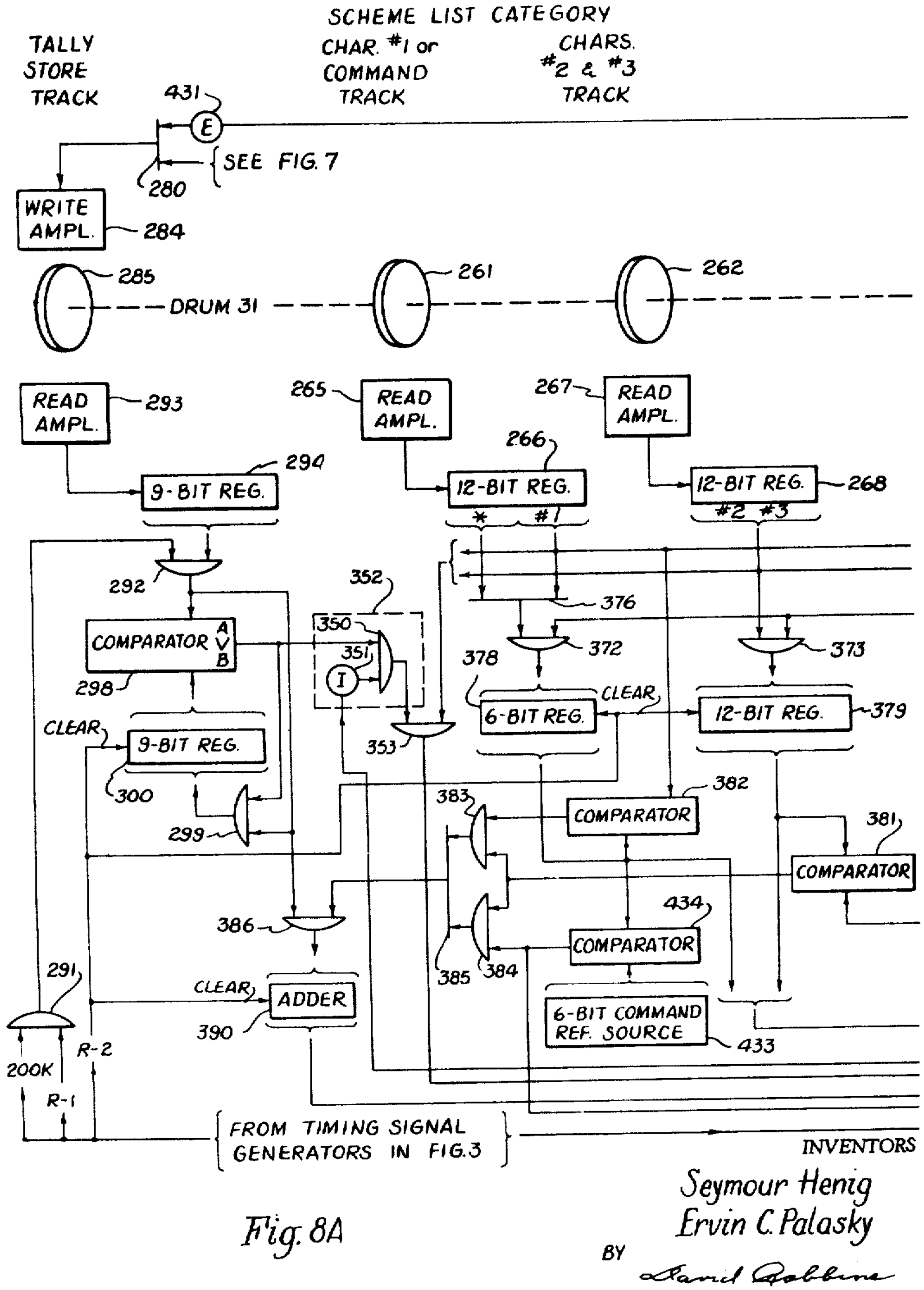

*Unload category selector* (*FIGS. 8A, 8B*)

FIGS. 8A and 8B disclose the detailed circuitry of the unload category selector 40 in FIG. 1, which is used to determine the next category code to be employed in forming a stack 46 on the conveyor belt 41. The selector thus determines the next active unload category code.

In obtaining optimum inventory reduction of the letters stored in slots 24*a*, during certain revolutions of memory drum 31, one of the following operations is performed:

(a) A search is made for the predominant category, direct or secondary, which then becomes the next active unload category.

(b) The magnitude of the tally code of a direct category on the scheme list is compared with the magnitude of its threshold code, while at the same time a search is made for the predominant category. If the tally exceeds its threshold, the direct category is selected. If not, the latter is skipped and the predominant category is selected as the next active unload category.

(c) A determination is made of the sum of the tallies of a programed secondary category and all the direct categories that may have been skipped and are associated with the former category. Concurrently, a search is made for the predominant category. If the magnitude of the sum fails to exceed the threshold for the secondary, the predominant category is selected. If, however, the sum exceeds the threshold, the secondary category is selected.

It is noted that when the secondary is selected, the latter and the related direct categories will be unloaded, in the manner indicated below, to form a single bundle.

To illustrate the above operations in somewhat greater detail, a typical sequence of events is presented immediately below with the assistance of Table I.

TABLE I.—UNLOAD CATEGORY SELECTION SCHEDULE

| Revolution of Drum 31 | Programed Category Opportunity | Programed Category Evaluation and Predominant Category Search | Count of Counter 107 | Count of Counter 116 | Time Gate Generated |
|---|---|---|---|---|---|
| 96 | | | 96 | 0 | |
| 97 | | | 97 | 0 | |
| 98 | | | 98 | 0 | |
| 99 | | | 99 | 0 | |
| 100 | | | 100 | 1 | |
| 101 | | Predominant | 101 | 1 | R-1 |
| 102 | | | 2 | 1 | R-2 |
| 200 | -RNY | | 100 | 2 | R-xSS |
| 201 | | -RNY-Pre | 101 | 0 | R-1 |
| 202 | | | 2 | 0 | R-2 |
| 300 | | | 100 | 1 | |
| 301 | | Predominant | 101 | 1 | R-1 |
| 302 | | | 2 | 1 | R-2 |
| 400 | -PNY | | 100 | 2 | R-xSS |
| 401 | | -PNY-Pre | 101 | 0 | R-1 |
| 402 | | | 2 | 0 | R-2 |
| 500 | | | 100 | 1 | |
| 501 | | Predominant | 101 | 1 | R-1 |
| 502 | | | 2 | 1 | R-2 |
| 600 | *-NY | | 100 | 2 | R-xSS |
| 601 | | *_NY-Pre | 101 | 0 | R-1 |
| 602 | | | 2 | 0 | R-2 |

Returning to FIG. 3, it will be recalled that device 102 is set to a binary number equal to the number of slots or pitch distance between the stacks 46 to be formed on the output of conveyor belt 41. Assume that device 102 has been set to 100 and that device 106 has been set to the desired multiplier 2. Then, time gates R–*x*SS, R–1 and R–2 will be generated during the revolutions of memory drum 31 tabulated in Table I. Each time gate will have a duration equal to the time interval required for the memory drum to make one revolution.

With reference to Table I, during revolution 101, a search is made for the predominant category. This is accomplished by comparing the tally for each category code with the previously acquired largest tally.

More specifically, on coincidence of time gate R–1 and each 200K pulse in and-gate 291 (FIG. 8A) the pulses are passed through 291 to 292, which represents nine and-gates. The tally codes are read out of store track 285 by read amplifier 293 and are transmitted in serial form to 9-bit register 294. The information in this register is fed through and-gates 292 in parallel form to comparator 298 and is branched to 299, which represents nine and-gates.

Comparator 298 is a "greater than" comparator. That is, when input A is greater than input B, an output is obtained from the comparator. When, for example 9-bit register 300 is empty and there is a number in a register 294, or the number in register 294 is greater than that in 300, the output of comparator 298 enables and-gates 299 and the information in register 294 is transferred to register 300. Thus, after the completion of one revolution of memory drum 31, register 300 contains the highest tally code recorded in store track 285.

The output of comparator 298 is applied to and-gate 350, which, together with inverter 351, forms and-not-gate 352. The output of and-gate 350 is applied to 353, which denotes eighteen and-gates.

Whenever a "greater than" comparison is obtained in comparator 298, character No. 1 and character Nos. 2 and 3 of the related category code, which are recorded in registers 266 and 268, respectively, are transmitted in parallel form through and-gates 353 and the eighteen or-gates 357 to 20-bit register 358. In this way, the highest tally code is recorded in register 300 during revolution 101 and the category code applicable to this tally is recorded in register 358.

Time gate R–1 is recorded in the two end positions of register 358. This provides each category code in the register with a lead and trail "1" bit, which are used in the stack-forming synchronizer 43 (FIGS. 1 and 9) described in detail below.

Register 300 is cleared on the occurrence of time gate R–2 during revolution 102. The end of R–2 is applied to terminal 1 of flip-flop 359, turning the latter on so that its output enables and-gate 360 to pass the category code in register 358, in serial form, to the stack-forming synchronizer 43 (FIG. 9), where the latter code becomes the next active unload category code.

It will be apparent that instead of selecting an active unload category code purely by predominance, as set forth in detail immediately above, the selection may be constrained by a desired threshold. This could be accomplished, for example, by applying the output of registers 294 and 371 to a greater-than comparator which would provide an output when the tally code in register 294 is greater than the threshold code in register 371. The output of the latter comparator would be applied to an and-gate position between comparator 298 and and-gate 350. In this way, the selection of the next active unload category code would be dependent upon the magnitude of the related threshold code written on track 290 as well as the predominance of the tally code recorded in register 294.

Time gate 40C–1Y, whose advent marks the end of the first one-fortieth sector of memory drum 31 after the termination of R–2, is applied to terminal 0 of flip-flop 359, turning the flip-flop off. This in turn inhibits and-gate 360 so that further information cannot be transmitted from register 358. The last-mentioned sector is sixty bits long, and since the information in register 358 is only twenty bits long, adequate time is provided for transferring the twenty-bit category code from the latter register to the stack-forming synchronizer.

The tally code for the predominant category just transmitted to the stack-forming synchronizer is erased from track 285 in the manner described in detail below.

The place mark track 362 stores a bit which indicates the next category in the scheme list to be checked. Thus, the bit recorded in the place on track 362 in FIG. 4C indicates that the direct category code in the one-fortieth sector of tracks 261, 262 in this figure is the next category in the scheme list to be checked.

The two hundred categories, that are used by way of example in the present embodiment, are recorded sequentially in the scheme list category tracks 261 and 262 and are arranged therein in a logical program so that the low volume, direct categories precede an associated secondary category.

When time-gate R–*x*SS is generated, it is applied to and-gate 363. This and-gate also receives the output of read amplifier 364 which senses store track 362 on which a place mark is recorded. Consequently, during a revolution when R–*x*SS occurs, a place mark is read by amplifier 364 and an output of and-gate 363 is obtained and applied to write amplifier 365. The place mark is then recorded on the retimer track 366. The reading head of amplifier 368 and the writing head of amplifier 369 are so positioned relative to tracks 366 and 362, respectively, that the information read from track 366 is written on track 362 twelve bits in advance of the position at which it was originally read on the latter track. Thus, the place mark is provided with a twelve bit advance on the occurrence of each time gate R–*x*SS.

Read amplifier 370 continuously reads the threshold codes in sequence from track 290. The latter codes are shifted bit-by-bit through 6-bit register 371. Simultaneously, the category code related to each threshold code is read from tracks 261, 262 and is shifted through registers 266, 268, bit-by-bit. On coincidence of the related place mark, read from track 362, and time gate R–*x*SS, the output of and-gate 363 enables and-gates 372 to 374. The threshold code is then duplicated in register 375, character No. 1 of the category code is duplicated in 6-bit register 378, and character Nos. 2 and 3 in 12-bit register 379.

Returning to Table I, during the 200th revolution of memory drum 31, the place mark for _RNY is read from track 362 by read amplifier 364 and is re-recorded on the same track with a twelve-bit advance, as the place mark for _PNY, the next category after _RNY to be checked. The output of and-gate 363 enables and-gates 372 to 374 to transfer character No. 1, in this case R, from register 266 via six or-gates 376 to register 378, character Nos. 2 and 3, in this case NY, from register 268 to register 379, and the threshold code for the category code _RNY from register 371 to register 375.

On the 201st revolution of memory drum 31, time gate R–1 is generated, a check is made to determine whether category _RYN exceeds its threshold and a search is made for the predominant category in the manner described above in connection with revolution 101.

On the occurrence of time gate R–1, and-gate 380 is enabled to pass the contents of register 268 to comparator 381. Since the contents of register 379 is also applied to this comparator, an identity is obtained, and the output of comparator 381 is directed to and-gates 383, 384. Since the contents of registers 266 and 378 are applied to comparator 382, the output of the latter comparator enables and-gate 383 to pass a signal through or-gate 385 to the nine and-gates 386. On the occurrence of the next 200K pulse, the information in register 294, which indicates the tally of category code _RNY, is duplicated in adder 390, via multiple and-gates 292, 386, and is then applied to comparator 391.

Comparator 391 is a "greater than" comparator. If the magnitude of input A, received from adder 390, is greater than input B, received from register 375, an output is obtained from the comparator.

In this example, it will be assumed that the tally code for _RNY, applied to comparator 391 by adder 390, is greater than the threshold code applied to the comparator by register 375. Then, the output of the comparator is transmitted to inverter 351 to inhibit and-not-gate 352. For the remainder of time, gate R–1, the code of the predominant category can not pass through and-gates 353 to register 358.

Returning to Table I, it is noted that during the 301st revolution of memory drum 31, a search is made for and the predominant category is selected in the same manner as during the 101st revolution of the drum.

During the 401st revolution of the memory drum, the tally of direct category code _PNY is compared with its threshold in comparator 391 and, at the same time, a search is conducted for the predominant category. Assume that the magnitude of the tally fails to exceed the magnitude of the threshold, then and-gate 392 will not be enabled to pass the direct category code from registers 378, 379 to register 358. When register 294 indicates the highest tally, and-not-gate 352 will not inhibit and-gate 353 and the predominant category, registered in registers 266 and 268, will be transferred to register 358 and will become the next active unload category. The direct category _PNY code will be skipped but will be included in the more inclusive secondary category bundle for *_NY, as will be described below.

During the 501st revolution of the memory drum 31, a search is made for the predominant category, in the same manner as during the 101st revolution, and in due course, the latter category becomes the next active unload category.

During the 600th revolution, time gate R–*x*SS is generated and is applied to and-gate 363. When the place mark for secondary code *_NY is read from track 362 and fed to and-gate 363, the output of 363 enables and-gates 372 to 374. The threshold code for this secondary category is then recorded in register 375, the command code * is recorded in register 378, and NY is recorded in register 379. The output of register 378 and the output of 6-bit command reference source 433 are applied to comparator 434. On the occurrence of an identity, the comparator directs a signal to and-gates 384 and 435.

When, during the 601st revolution, time gate R–1 is generated and fed to and-gate 380, the information in register 268 is applied to comparator 381. The information in register 379 is likewise applied to this comparator. On the occurrence of an identity, the output signal of the comparator is transmitted through and-gate 384 and or-gate 385 to and-gate 386. (Concurrently, during this revolution a search is made for the predominant category.)

The tallies for all category codes in Table I that end in NY and that were previously skipped, in this example _PNY as well as any new tally for _RNY, resulting from interim letter additions to slots 24*a*, are now totaled with *_NY in adder 390. The output of the adder is applied to comparator 391 where it is compared with the threshold code for *_NY, recorded in register 375. Assuming that the magnitude of the tally exceeds that of the threshold, the comparator applies a signal to inverter 351 to prevent the selection of the predominant category. The latter signal is branched to and-gates 392 to transfer the category code in registers 378, 379 to register 358. The end of time gate R–2, occurring during the 602nd revolution of memory drum 31, turns flip-flop 359 on to enable and-gate 360 to transmit the information in register 358 to the stack-forming synchronizer 43 in FIG. 9. Thus, the secondary code *_NY is selected as the next active unload category.

When a secondary category is selected through predominance as the next active unload category, the tally code for the former category is erased from track 285.

When, for example, *_NY is selected as the predominant category code, the command code * is read out of track 261 and is shifted bit-by-bit through register 266. This code, however, is not applied to and-gates 353 and consequently can not be transferred to register 358. It should be noted here that character No. 1, read out of track 261, is blank. Characters NY are read out of track 262, are shifted through register 268 and are then transferred to register 358. Thus, character No. 1 in register 358 is blank, while characters Nos. 2 and 3 are N and Y, respectively. The blanks in registers 266 and 358 are applied to comparator 410 and characters NY in registers 268 and 358 are applied to comparator 411 so that identities are found in each comparator and their outputs are directed to and-gates 415 and 412, respectively.

When a 200K pulse and time gate R–2 coincide in and-gate 414, the latter directs a signal to and-gate 412, which then sends a signal through and-gate 415 and or-gate 421 to turn on flip-flop 422. The output of the flip-flop is applied to write amplifier 423 and is also branched to and-gate 425. On the occurrence of the next 200K pulse, and-gate 414 enables and-gate 425 to turn flip-flop 422 off. Thus, the putput of the flip-flop, having a duration of twelve bits, is applied to write amplifier 423 to record twelve "1" bits on retimer track 424. These bits are read by read amplifier 430, converted to an erase signal in eraser 431, and are fed through or-gate 280 to write amplifier 284, which then erases the tally code on store rack 285 for category code *_NY.

When a secondary category code is selected as the next active unload category code through a programed opportunity, the tally codes for the secondary category and the associated direct categories are erased from track 285.

When, for example, *_NY is selected as a programed category, the command code * is shifted through register 266 and characters NY are shifted through register 268. On the occurrence of time gate R–*x*SS, the information in registers 266 and 268 is transferred to registers 378 and 379, respectively. On the occurrence of time gate R–1, during the following revolution of memory drum 31, a greater-than comparison is obtained in comparator 391, whose output is applied to and-gates 392. The command code is then transferred from register 378 to register 358 and characters NY are transferred from register 379 to register 358.

The command code in register 378 is compared in comparator 434 with the output of command reference source 433. An identity is found during the revolution of memory drum 31 when time gate R–1 occurs. Since the output of comparator 391 is branched to and-gate 435, the output of comparator 434 is sent through and-gate 435 to terminal 1 of flip-flop 436. The flip-flop is turned on and remains on until the end of time gate R–2, which occurs during the following revolution of memory drum 31. The flip-flop transmits a signal to and-gate 416.

During the revolution in which time gate R–2 occurs, each direct category code, read from track 262 and ending in NY, effects a comparison in comparator 411. On the occurrence of a 200K pulse, the output of and-gate 414 is transmitted through and-gates 412, 416 and or-gate 421 to terminal 1 of flip-flop 422, turning the flip-flop on. The output of the flip-flop, in turn, is applied to write amplifier 423 to erase the tally code for the direct category code. Thus, the tally code for each of the direct category codes ending in NY is erased from track 285. It should be noted that the non-identies of character No. 1 in comparator 410 are ignored, since a bypass is opened when and-gate 416 is enabled by flip-flop 436.

Figure 9:
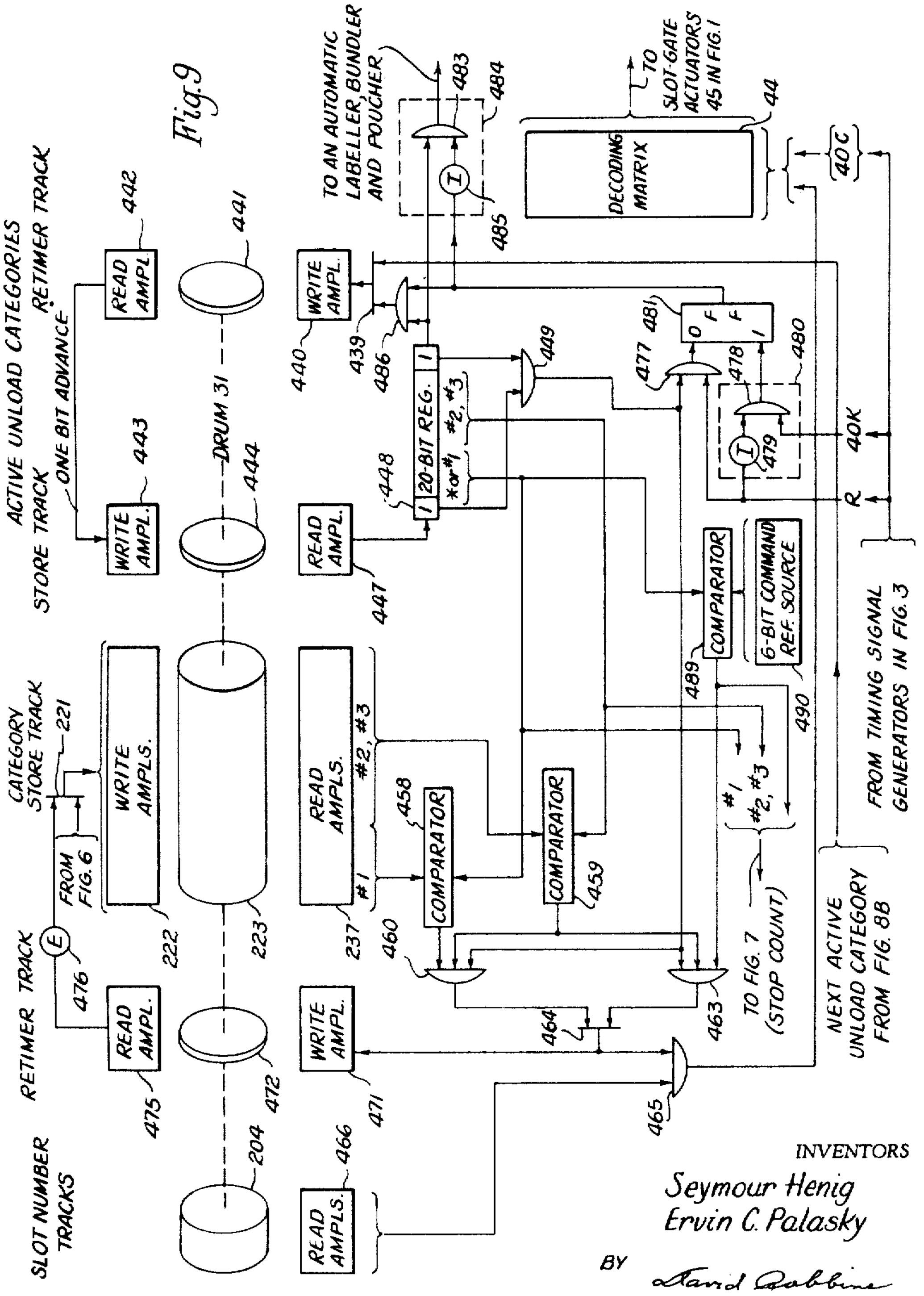
FIG. 9 is a circuit diagram of an embodiment of the stack-forming synchronizer used in FIG. 1.

*Stack-forming synchronizer* (*FIG. 9*)

The function of the stack-forming synchronizer 43, shown in detail in FIG. 9, is to control the formation of the stacks of letters on conveyor belt 41. In performing this function, the synchronizer is responsive to ten to thirty active unload categories that are selected in the fashion illustrated immediately above.

After the active unload category code has been selected and written into register 358 in FIG. 8B, on the occurrence of the trailing edge of the next time gate R–2, and-gate 360 transfers the category code through or-gate 439 in FIG. 9 to write amplifier 440. The code is written in serial form in retimer 441, is sensed by read amplifier 442 and is sent to write amplifier 443. The active unload category code is then written on store track 444 with a one bit advance so that the trail bit of the code is in line with the category code, if any, recorded in tracks 223 for the 1-slot of the twenty-four hundred slots 24*a*. (See FIG. 4B.)

The fiducial mark or pre-recorded bit on clock track 98 (FIG. 3) corresponds to the 0-slot of slots 24*a* and also corresponds to the point in the revolution of memory drum 31 when the timing generators (FIG. 3) start to generate time gates R–*x*SS, R–1, and R–2. A reference point on conveyor belt 41 (FIG. 2) represents the trailing edge of the space allocated to the formation of a stack 46 on the belt. It will be recalled that the time required for a reference point on the belt to traverse the width of one slot 24*a*, plus a fixed interval of time, is equal to the time required for one revolution of memory drum 31. Accordingly, an active unload category code is written on track 441 when the reference point passes the 0-slot and is read for the first time by read amplifier 447 when the reference point, plus one twenty-four hundredth of the space allocated to the formation of a stack, passes the 1-slot of slots 24*a*.

The active unload category code on track 444 are read continuously into 20-bit shift register 448 by means of read amplifier 447. With no more than thirty twenty-bit letter category codes, regularly spaced on this twenty-four hundred bit track, the blank gaps between the category codes is invariably more than twenty bits. Because it is not possible for the beginning and end of successive codes to be in register 448 at once, it is possible to indicate that a complete code is contained in the register by applying the lead trail bits to and-gate 449. The output of this and-gate indicates that a complete category code is present in the register.

It is noted here that the output of read amplifiers 237 (FIGS. 7, 9) is applied to and-gates 236 and is branched to comparator 249 (FIG. 7) and to comparators 458, 459 (FIG. 9).

Assume that a direct, active unload category is read out of track 444 for the first time and is recorded in register 448. Simultaneously, road amplifiers 237 read the category code in tracks 223 that is related to the 1-slot of slots 24*a*. Character No. 1 in the output of the read amplifiers and in register 448 are compared in comparator 458, while character Nos. 2 and 3 are compared in comparator 459. Since identities are found in comparators 458 and 459, the output of comparator 458 is applied to and-gate 460 and the output of comparator 459 is branched to and-gates 460, 463. Since a "1" bit is located at both ends of register 448, the output of and-gate 449 enables and-gate 460 to pass a signal through or-gate 464 to 465, which represents six and-gates. The code number of the 1-slot is now read from tracks 204 by read amplifiers 466 and is passed, in parallel form, through and-gates 465 to the decoding matrix 44. The matrix is then controlled, in a manner to be described in detail below, to effect the discharge of the letter in the 1-slot of slots 24*a* to the conveyor belt 41 in FIG. 2A, thereby starting the formation of a stack of letters on the conveyor belt.

Summarizing the above operations with the assistance of FIG. 4D, at reference point P′, the active unload category code, designated as N, has just been read out of store track 444 and is positioned in register 448. The related category code is read out of tracks 223 and is compared in comparators 458, 459 with code N. Since an identity is found in each comparator, the slot number in tracks 204, on line with the category code, is applied to the decoding matrix 44, which generates a gate-release signal. The latter signal is applied to one of the slot-gate actuators 45 in FIG. 1, so that the letter contained in the associated slot 24*a* is discharged to start the formation of a stack 46 on conveyor belt 41.

Returning to FIG. 9, and-gate 478 and inverter 479 form and-not-gate 480. In the absence of an R-bit pulse on inverter 479 and the presence of a 40K pulse on and-gate 478, the latter and-gate provides an output signal that is applied to terminal 1 of flip-flop 481, turning the flip-flop on. Thus, in the present embodiment, after the occurrence of the first 40K pulse, flip-flop 481 is normally on.

The output of flip-flop 481 enables and-gate 486 and the active unload category code under consideration passes bit-by-bit through register 448, the latter and-gate and or-gate 439 to write amplifier 440. The code is then written on track 441, sensed by read amplifier 442 and advanced one bit on track 444 from the position in which it was previously written on this track. The trail bit of the active unload category code is now in line with the letter category code, if any, recorded in tracks 223 and the number code, if any, recorded in tracks 204 for the letter in the 2-slot of slots 24*a*.

It should be noted that after a category code is read and before the code is rewritten on either track 441 or 444, the category code is erased by an erase head not shown in FIG. 9.

The operations, indicated in detail above, are now repeated with a category code written in tracks 223 for the 2-slot of slots 24*a*. If identities are obtained in comparators 458 and 459, a slot number code, read from tracks 204, is transmitted to decoding matrix 44 to permit the letter in the 2-slot to be discharged into the stack 46 forming on conveyor belt 41 in FIG. 2A. The same sequence of operations are performed for the remaining slots 24*a*.

The conveyor belt advances the width of one slot 24*a* minus a small, fixed lag for each revolution of memory drum 31, so that each letter added to a stack 46 in FIG. 2A drops to a location on the belt slightly in advance of the previous letter. Ideally, each letter of a stack will partially overlap the previous letter so as to present an orderly feathered arrangement.

The example presented in detail above relates to a direct category code. When a secondary category code, say *_NY, is selected through predominance as an active unload category code, only the characters NY are written on track 444. When this category code is read out of track 444 and is shifted through register 448, character No. 1 in the register is blank and characters Nos. 2 and 3 are N and Y, respectively. If _NY is written in tracks 223 on line with this active unload category code, identities are found in comparators 458, 459. As indicated in the example above, the outputs of these comparators enable and-gates 465 to pass the slot number, read out of tracks 204, to the decoding matrix 44. This will effect the discharge of the letter in the related slot 24 to the appropriate stack 46 forming on the conveyor belt 41.

In contrast, when the secondary category code is selected as an active unload category code through a programed opportunity, the characters * NY are written on track 444 and the command code and characters N and Y are then recorded in register 448. Since the command code in the register is compared in comparator 489 with the command code provided by the 6-bit command reference source 490, each time that a letter category code ending in NY is encountered on tracks 223 in line with this active unload category code, the associated letter in one of the slots 24*a* is discharged to the stack 46 forming on conveyor belt 41. Thus, the stack comprises letters in the secondary code *_NY and in the direct categories associated with the same. It should be noted here that the output of command reference source 490 and the command code in register 448, when applied to comparator 489, permits ignoring character No. 1 of the associated direct category codes written on tracks 223.

In view of the foregoing, it will be apparent that each time one of the active unload categories is read out of track 444, it is returned to that track with a one bit advance in angular position. In effect, the read amplifier 447 senses each active unload category during one revolution of memory drum 31 and on the succeeding revolution each code is advanced into alignment with the category code and slot number code for the next slot 24*a*. Hence, starting at the 1-slot, each active unload category code traverses track 444 and is sequentially compared with a letter category code for each slot 24*a*. When identities are found in either comparators 458 and 459 or comparators 459 and 489, a signal is generated and applied to decoding matrix 44 to control the formation of a stack of letters, associated with that unload category, on conveyor belt 41.

The arrangement for erasing the letter category codes from track 223 will now be discussed. When a letter category code is written on tracks 223 in line with an identical direct unload category code, identities are obtained in comparators 458, 459. The output of and-gate 460 is then branched through or-gate 464 to write amplifier 471, is written on retimer track 472, sensed by read amplifier 475 and converted to an erase signal by eraser 476. The output of 476 is passed through or-gate 221 to the eighteen write amplifiers 222, erasing that category code which had produced the identity signal when read out of these tracks by read amplifiers 237 and applied to the comparators.

When a category code is written on tracks 223 in line with an identical secondary active unload category code, derived through predominance, identities are obtained in comparators 458, 459 and the code on tracks 223 is erased in the manner just indicated. Finally, when a relevant category code on tracks 223 is in line with the secondary active unload category code, derived through a programed opportunity, identities are found in comparators 459, 489 and the category code on tracks 223 is erased, again in the manner indicated above. Here, it should be noted that the associated direct category codes on tracks 223 are included for erasure.

The output of and-gate 449 coincides with the R-bit pulse in and-gate 477 only upon the full circumferential traverse of track 444 of an active unload category code. At this time, a signal is applied to terminal 0 of flip-flop 481, turning the latter off, so that the information in register 448 will not pass through and-gate 486 to write amplifier 440, but will pass through and-gate 483 in and-not-gate 484 to an automatic labeller, bundler and poucher. The next 40K pulse passes through and-gate 478 to terminal 1 of flip-flop 481, turning the latter on. The output of the flip-flop is then applied to inverter 485, so that and-gate 483 is inhibited while and-gate 486 is enabled to pass the information in register 448 to write amplifier 440. Thus, a time gate that is sixty bits long is provided during which the output of register 448 is switched from write amplifier 440 to the labeller, bundler and poucher.

It will be recalled that each sorting station 1 to 20 contains a rack 27 divided into rack-half X and rack-half Y. Since there are sixty slots 24*a* in each rack-half, there are, in total, twenty-four hundred slots. Each slot is provided with a pivotally mounted, normally-closed discharge gate 24*b* (FIG. 2B). The gate is adapted to be opened by a release mechanism that is operatively connected to the plunger of flag assembly 75 (FIG. 2A) and is described in detail in the above-mentioned U.S. Patent No. 2,863,-574. The release mechanism for each gate is controlled by a solenoid that is connected to a respective one of twenty-four hundred lines in the output of decoding matrix 44. The release mechanisms and solenoids for all the gates 24*b* are designated by the slot-gate actuators 45 in FIG. 1.

As previously described, each slot number code in tracks 204, when related to an active unload category, is passed through and-gates 465, in parallel form, to decoding matrix 44. Counter 91 in FIG. 3 generates forty time gates 40C of alternate X and Y components. The sequential time gates are applied to decoding matrix 44 and together with the six bits of the slot number code cause potential to be applied to one of the lines in the output of the decoding matrix. Thus, when the code of a slot number is applied to the matrix, a potential appears on one of its twenty-four hundred output lines to energize a solenoid which operates a release mechanism to open a discharge gate 24*b*. A letter is then discharged by gravity from the associated slot 24*a* to conveyor belt 41 in FIG. 2B. Subsequent de-energization of the solenoid operates a reset mechanism, described in the above patent, to restore the flag assembly 75 to the elevated position in FIG. 2A. Since the discharge gate 24*b* is spring biased, restoration of the flag assembly causes the gate to close.

As set forth above, in keeping a running inventory of the categories of the letters in slots 24*a*, a letter is not counted if it is in an active unload category and is positioned in a slot in advance of the stack 46, forming on conveyor belt 41 for this category. The arrangement for accomplishing this result will now be described.

In keeping the inventory of a particular category, as described above in connection with FIG. 7, each letter category code is read out of tracks 223 and is applied through register 241 to comparator 249. When an identity is obtained in the comparator and flip-flop 250 is turned on, the output of the comparator is passed through and-gate 251 to advance counter 252. When the category code in register 448 (FIG. 9) is identical to the letter category code in register 241, or when a secondary category code, obtained through a programed opportunity is present in register 448 and character Nos. 2 and 3 in this register are identical to character Nos. 2 and 3 in register 241, the output of flip-flop 250 is turned off and the output of comparator 249 can not pass through and-gate 251 to advance the counter.

More specifically, when the active unload category in register 448 in FIG. 9 is a secondary category, derived through a programed opportunity, an identity is obtained in comparator 489 between the command code in the register and the output of reference sources 490. The output of this comparator is then passed through or-gate 491 in FIG. 7 to and-gate 492. Similarly, character Nos. 2 and 3 of the code in register 448 are compared in comparator 493 (FIG. 7) with character Nos. 2 and 3 in register 241. Since an identity is obtained the output of comparator 493 is transmitted through and-gate 492 to terminal 0 of flip-flop 250, turning the flip-flop off. And-gate 251 is then closed and the advance of counter 252 is inhibited, so that the codes of the secondary category and its associated direct categories are discounted for the remainder of the tally.

On the other hand, when the active unload category in register 448 is a direct category, or a secondary category obtained through predominance, character No. 1 in the register is compared in comparator 494 (FIG. 7) with character No. 1 in register 241, and character Nos. 2 and 3 in register 448 are compared in comparator 493 with character Nos. 2 and 3 in register 241. Since identities are found in both comparators, their outputs enable and-gate 492 to apply a signal to terminal 0 of flip-flop 250, turning the flip-flop off. Once again, and-gate 251 is closed and counter 252 can not be advanced.

It should be noted that the flip-flop is not turned on again until the occurrence of the next R-bit pulse at the start of the next revolution of memory drum 31. In this way the count of all the letters in slots 24*a* that are assigned an active unload category code and are located in advance of the related stack 46, forming on conveyor belt 41. will be disregarded in the tally.

What is claimed is:

1. An information storage and selector system comprising:

storage means for storing a plurality of category codes, means for keeping a running inventory that includes a plurality of tally codes, each having a magnitude indicating the number of times a particular category code is present in said storage means, evaluating means for selecting a tally code having a desired magnitude, means for selecting the category code related to the selected tally code, means responsive to the selection of the latter tally code for reading each occurrence of the selected category code out of said storage means, and means for erasing the selected tally code from said running inventory.

2. An information storage and category selector system comprising:

means for receiving a plurality of slot number codes and a plurality of category codes, each category code being related to a respective one of said slot number codes, a storage device having a plurality of slot number codes pre-recorded therein, recording means responsive to each received slot number code for recording the related category code in said storage device in a predetermined relation to the same slot number code pre-recorded therein, the category codes being recorded in such a manner that a plurality of the same category codes, each related to a different slot number code, are recorded in said storage device, inventory means for keeping a running inventory comprising a plurality of tally codes, each having a magnitude indicating the number of times a particular category code is recorded in said storage device, and means for selecting a category code related to a tally code of desired magnitude.

3. The system set forth in claim 2 including a memory device, means for transferring the selected category code to said memory device, and means for comparing in sequence each category code in said storage device with the selected category in said memory device and for generating an output signal when the codes are identical.

4. The system set forth in claim 3 including
means responsive to each output signal for generating an erase signal, whereby each erase signal is related to a respective category code recorded in said storage device, and
means responsive to each erase signal for erasing the related category code from said storage device.

5. The system set forth claim 2 wherein
each received category code is contained in a scheme list, and wherein the system includes:
means for generating a code representing the threshold of each received category code, and
wherein the selecting means comprises:
means for comparing the magnitude of the threshold code for each category code with the magnitude of its tally code, and
means dependent upon the output of the comparing means for selecting a category code related to a tally code of desired magnitude.

6. The system set forth in claim 2 wherein
the selecting means comprises:
means for determining a first category code related to a tally code of desired magnitude,
means for selecting the category code related to said tally code of desired magnitude,
means for determining the tally code of a second category code, and
means dependent upon the latter tally code for selecting the second category code and for inhibiting the selection of the category code related to said tally code of desired magnitude.

7. The system set forth in claim 2 wherein
the received category code include secondary and related direct category codes, and
the selecting means comprises:
means for selecting a category code related to a tally code of desired magnitude,
means for generating a control signal representing the sum of the tally codes of a desired secondary and its related direct category codes, and
means responsive to said control signal for selecting the desired secondary category code and its related direct category codes and for inhibiting the selection of the category code related to the tally code of desired magnitude.

8. The system set forth in claim 2 wherein
the inventory-keeping means comprises:
a count section positioned in said storage device,
means for recording a count signal in the count section for each category code recorded in said storage device,
means for generating a plurality of tally codes, each representing the number of count signals related to a particular category code recorded in said storage device,
a tally section positioned in said storage device, and
means for recording each of said tally codes in said tally section.

9. The system set forth in claim 8 including
erasing means comprising:
means for generating a plurality of control signals, each associated with a respective recorded category code and its related count signal,
means for converting each control signal to an erase signal, and
means responsive to each erase signal for erasing the associated count signal from the count section.

10. The system set forth in claim 2 including
memory means for storing a plurality of threshold codes, each related to a respective one of said category codes and a place mark signal designating a respective one of said category codes,
means for advancing the place mark signal in said memory means so that it designates predetermined ones of the category codes in succession,
means for reading the place mark signal out of said memory means,
a comparator,
means responsive to the place mark signal for transferring to the comparator the threshold code related to the category code designated by the place mark signal,
means for applying to said comparator the tally code related to the category code designated by the place mark signal, the comparator providing an output signal when the threshold code has a desired relation to the tally code applied thereto, and wherein the selecting means comprises:
means responsive to the output signal for selecting the category code designated by said place mark signal and inhibiting the selection of the category code related to the tally code having the desired magnitude.

11. The system set forth in claim 2 wherein
said plurality of category codes include:
a group of category codes comprising a secondary category code and direct category codes related thereto, and wherein
the system includes:
means for storing a threshold code related to said secondary category code,
an adder,
means for applying to said adder the tally code for said secondary category code and the tally codes for each of the related direct category codes,
a comparator, and
means for applying the output of said adder and the threshold code related to said secondary category code to said comparator, said comparator providing an output when the output of said adder bears a desired relation to the threshold code applied thereto, and wherein
the selecting means comprises:
means responsive to the output of said compartor for selecting the group of category codes and for inhibiting the selection of the category code related to the tally code of desired magnitude.

12. The system set forth in claim 2 including
means for storing a plurality of threshold codes, each related to a respective one of said category codes, whereby each tally code and a respective threshold code are related to each other,
means for reading out of the storage means a selected threshold code and its related tally code,
means for comparing the magnitude of the selected threshold code and its related tally code, and wherein
the selecting means comprises:
means dependent upon the output of the comparing means for selecting the category code related to the selected threshold code and for inhibiting the selection of the category code related to the tally code of desired magnitude.

13. The system set forth in claim 2 wherein
said recording means comprises:
a memory device having a number section and a category section positioned therein,
means for generating a sequence of timing signals, each designating a sector of said number section and a related sector of said category section, each sector of said number section having a plurality of slot number codes pre-recorded therein, and
control means responsive to the received slot number code and to the same slot number code pre-recorded in the sector designated by a respective one of said timing signals for recording the received category code in the sector of said category section designated by the last-mentioned timing signal.

14. The system set forth in claim 13 wherein said control means comprises:

a buffer section positioned in said memory device, means for generating a plurality of control signals during the time interval of each of said timing signals, means responsive to said control signals and to a respective one of said timing signals for recording the received slot number and category codes in said buffer section, reading means responsive to said control signals for reading the received number and category codes out of said buffer section, and recording means responsive to the number code read out of said buffer section and to the same number code pre-recorded in the sector designated by a last-mentioned timing signal for recording the received category code in the sector of said category section designated by the last-mentioned timing signal.

15. The system set forth in claim 14 including erasing means comprising:

means responsive to each category code read out of said buffer section for generating an erasing signal, whereby each category code is related to a respective erasing signal, and means responsive to each erasing signal for erasing the related category code from said buffer section.

16. An information storage and category selector system comprising:

means for receiving a plurality of secondary and direct category codes, each secondary code being related to a plurality of direct category codes, means for receiving a plurality of slot number codes, each related to a secondary or a direct category code, a storage device having a plurality of slot number codes pre-recorded therein, means responsive to each received slot number code for recording the related secondary or direct category code in said storage device in a predetermined relation to the same slot number code pre-recorded therein, the category codes being recorded in such a manner that a plurality of the same cateory codes, each related to a different slot number code, are recorded in said storage device, means for keeping a running inventory comprising a plurality of tally codes, each having a magnitude indicating the number of times one of said category code is recorded in said storage device, means for generating a control signal representing the sum of the tally codes of a desired secondary and its related direct category codes, and means responsive to said control signal for selecting the desired secondary code and its related direct category codes.

References Cited

UNITED STATES PATENTS

| | | | |
|---|---|---|---|
| 3,067,874 | 12/1962 | Rigg et al. | 209—111.5 |
| 3,246,751 | 4/1966 | Brenner et al. | 209—111.5 |
| 3,252,596 | 5/1966 | Beecher et al. | 214—11 |

PAUL J. HENON, *Primary Examiner.*

R. RICKERT, *Assistant Examiner.*